(12) United States Patent
Neumayr et al.

(10) Patent No.: US 11,404,962 B2
(45) Date of Patent: Aug. 2, 2022

(54) SWITCHED MODE POWER CONVERTER THAT IS SWITCHED USING CURRENT THRESHOLDS

(71) Applicant: Infineon Technologies Austria AG, Villach (AT)

(72) Inventors: Dominik Neumayr, Zurich (CH); Dominik Bortis, Zurich (CH); Gerald Deboy, Klagenfurt (AT); Marc Fahlenkamp, Geretsried (DE); Johann Kolar, Zurich (CH); Martin Krueger, Oberschleissheim (DE); Anthony Sanders, Weissenfeld (DE)

(73) Assignee: Infineon Technologies Austria AG, Villach (AT)

( * ) Notice: Subject to any disclaimer, the term of this patent is extended or adjusted under 35 U.S.C. 154(b) by 10 days.

(21) Appl. No.: 16/521,902

(22) Filed: Jul. 25, 2019

(65) Prior Publication Data
US 2019/0348916 A1 Nov. 14, 2019

Related U.S. Application Data

(63) Continuation of application No. 15/983,980, filed on May 18, 2018, now Pat. No. 10,404,171.

(30) Foreign Application Priority Data

May 19, 2017 (DE) .......................... 102017111006.2

(51) Int. Cl.
*H02M 3/158* (2006.01)
*H02M 3/156* (2006.01)
(Continued)

(52) U.S. Cl.
CPC ............. *H02M 3/158* (2013.01); *H02M 1/08* (2013.01); *H02M 1/32* (2013.01); *H02M 3/1563* (2013.01);
(Continued)

(58) Field of Classification Search
CPC .......... H02M 3/158; H02M 1/08; H02M 1/32; H02M 3/1563; H02M 1/0048; H02M 1/322; H02M 1/40
See application file for complete search history.

(56) References Cited

U.S. PATENT DOCUMENTS 9,819,264 B1 11/2017 Boezen
2007/0043269 A1 2/2007 Mannheimer et al.
(Continued)

FOREIGN PATENT DOCUMENTS

CN 102097934 A 6/2011

OTHER PUBLICATIONS

Ramesh, Vaddi, et al., "An Adaptive Hysteresis Band Current Controlled Shunt Active Power Filter", International Journal of Advanced Research in Electrical, Electronics and Instrumentation Engineering, vol. 3, Issue 3, Mar. 2014, pp. 8031-8040.
(Continued)

*Primary Examiner* — Rafael O De Leon Domenech
(74) *Attorney, Agent, or Firm* — Murphy, Bilak & Homiller, PLLC

(57) ABSTRACT

Disclosed is a power converter circuit and a method for operating the power converter circuit. The power converter circuit includes at least one converter stage and a control circuit. The at least one converter stage includes an input configured to receive an input power, an output configured to supply an output power, a first electronic switch, and a first inductor coupled to the first electronic switch. The control circuit includes a hysteresis controller configured to drive the first electronic switch based on a current measurement signal representing a current through the inductor, a first threshold signal, and a second threshold signal, and an operating point controller configured to detect an operating point of the converter stage to generate the first threshold
(Continued)

signal and the second threshold signal based on the detected operating point.

18 Claims, 15 Drawing Sheets

(51) Int. Cl.
　　　H02M 1/08　　(2006.01)
　　　H02M 1/32　　(2007.01)
　　　H02M 1/40　　(2007.01)
　　　H02M 1/00　　(2006.01)
(52) U.S. Cl.
　　　CPC .......... *H02M 1/0048* (2021.05); *H02M 1/322* (2021.05); *H02M 1/40* (2013.01)

(56) References Cited

U.S. PATENT DOCUMENTS

| | | | |
|---|---|---|---|
| 2008/0067993 A1 | 3/2008 | Coleman | |
| 2010/0315016 A1* | 12/2010 | Hoogzaad | H05B 33/0818 |
| | | | 315/224 |
| 2012/0223691 A1 | 9/2012 | Weinstein et al. | |
| 2013/0043828 A1* | 2/2013 | Gurlahosur | H02J 7/00718 |
| | | | 320/107 |
| 2013/0127430 A1* | 5/2013 | Leung | H02M 3/157 |
| | | | 323/282 |
| 2014/0006808 A1 | 1/2014 | Sizikov et al. | |
| 2014/0217996 A1 | 8/2014 | Peker et al. | |
| 2014/0253181 A1 | 9/2014 | Mukherjee | |
| 2015/0162830 A1 | 6/2015 | Dong et al. | |
| 2015/0381037 A1* | 12/2015 | Romeo | H02M 3/156 |
| | | | 323/282 |
| 2016/0204702 A1* | 7/2016 | Padyana | H02M 3/1563 |
| | | | 323/271 |
| 2016/0301303 A1 | 10/2016 | Bari et al. | |
| 2016/0345395 A1* | 11/2016 | Chen | H05B 45/38 |
| 2018/0048232 A1* | 2/2018 | Adell | H02M 3/157 |
| 2018/0091046 A1* | 3/2018 | Krueger | H02M 1/08 |
| 2018/0109198 A1* | 4/2018 | Kolar | H02M 1/44 |
| 2018/0123450 A1* | 5/2018 | Moon | H02M 1/00 |
| 2018/0337599 A1* | 11/2018 | Chen | H02M 3/158 |

OTHER PUBLICATIONS

Wu, Xiaohui, et al., "Adaptive Hysteresis Window Control (AHWC) Technique for Hysteretic DC-DC Buck Converter with Constant Switching Frequency", 2010 Asia-Pacific Power and Energy Engineering Conference (APPEEC), Mar. 28-31, 2010, pp. 1-4.

* cited by examiner

SWITCHED MODE POWER CONVERTER THAT IS SWITCHED USING CURRENT THRESHOLDS

This disclosure in general relates to a power converter circuit, particularly a power converter circuit with a switched mode power converter.

Switched mode power converters (which are often also referred to as switched mode power supplies (SMPS)) are widely used in various types of automotive, industrial, household or consumer electronic applications. A switched mode power converter includes at least one electronic switch coupled to at least one inductor. A switched mode power converter is configured to receive an input power which is given by an input current multiplied with an input voltage at an input and supply an output power which is given by an output voltage multiplied with an output current to a load coupled to an output. By regulating the input power received at the input the switched mode power converter may regulate at least one operating parameter, for example, the output voltage, the output current, or the input current. The input power is regulated by regulating a current through the at least one inductor, whereas the inductor current is regulated by a switched mode operation of the at least one electronic switch.

The switched mode operation of the at least one electronic switch may include operating the electronic switch in a plurality of successive drive cycles, with each drive cycle including an on-time in which the at least one electronic switch is switched on and an off-time in which the at least one electronic switch is switched off. Inevitably, converting power by the switched mode power converter is associated with power losses. These power losses are given by a difference between an overall input power, which also includes a power supply of the switched mode power converter itself, and an output power available at the output. These power losses include, for example, conduction losses, switching losses, or hysteresis losses in the inductor. Conduction losses are losses due to ohmic resistances in conductors and electronic devices of the power converter. Switching losses are losses associated with the switched mode operation of the at least one electronic switch such as losses associated with charging and discharging (parasitic) capacitances of the at least one electronic switch. And, hysteresis losses are losses associated with magnetizing and demagnetizing the inductor. It is desirable to reduce those power losses.

One example relates to a power converter circuit. The power converter circuit includes at least one converter stage and a control circuit. The at least one converter stage includes an input configured to receive an input power, an output configured to supply an output power, a first electronic switch, and a first inductor coupled to the first electronic switch. The control circuit includes a hysteresis controller configured to drive the first electronic switch based on a current measurement signal representing a current through the inductor, a first threshold signal, and a second threshold signal, and an operating point controller configured to detect an operating point of the converter stage to generate the first threshold signal and the second threshold signal based on the detected operating point.

Another example relates to a method. The method includes detecting an operating point of at least one converter stage including an electronic switch and an inductor coupled to the electronic switch in a power converter circuit, selecting a first threshold and a second threshold based on the detected operating point, and driving the electronic switch based on the first threshold and the second threshold and a current measurement signal representing a current through the inductor.

Yet another example relates to a method. The method includes finding an optimum switching frequency of an electronic switch in a power converter stage of a power converter circuit at each of a plurality of different operating points; sensing a current through an inductor connected in series with the electronic switch; and in each operating point, at the optimum frequency, detecting a maximum current through the inductor and a minimum current through the inductor.

Examples are explained below with reference to the drawings. The drawings serve to illustrate certain principles, so that only aspects necessary for understanding these principles are illustrated. The drawings are not to scale. In the drawings the same reference characters denote like features.

In the following detailed description, reference is made to the accompanying drawings. The drawings form a part of the description and by way of illustration show specific embodiments in which the invention may be practiced. It is to be understood that the features of the various embodiments described herein may be combined with each other, unless specifically noted otherwise.

Figure 1:
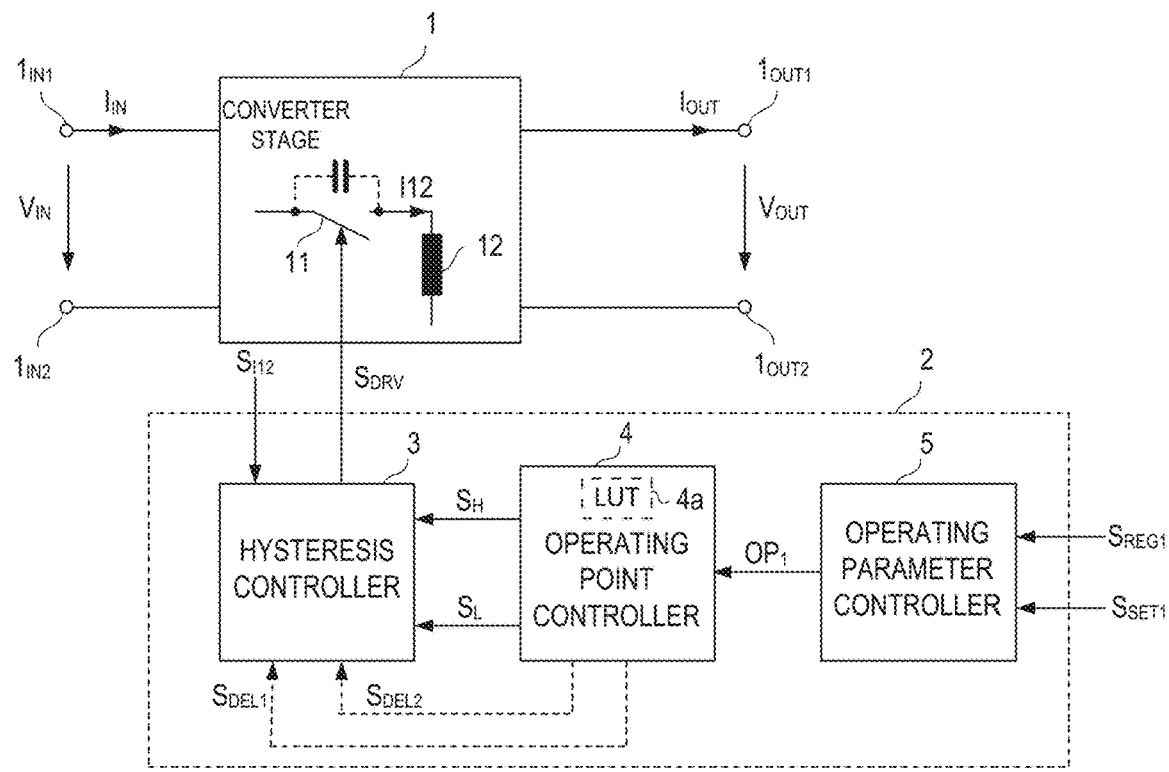
FIG. 1 shows a block diagram that illustrates one example of a power converter circuit that includes a converter stage with an electronic switch and an inductor, and a control circuit with a hysteresis controller and an operating point controller.

FIG. 1 shows a power converter circuit in particular a switched mode power converter circuit (switched mode power supply, SMPS) according to one example. Referring to FIG. 1, the power converter circuit includes a converter stage 1 with an input configured to receive an input power and an output configured to supply an output power. The input may include a first input node $1_{IN1}$ and a second input node $1_{IN2}$, and the output may include a first output node $1_{OUT1}$ and a second output node $1_{OUT}$. The input power received by the converter stage 1 is given by an input current $I_{IN}$ multiplied with an input voltage $V_{IN}$ and the output power is given by an output current $I_{OUT}$ multiplied with an output voltage $V_{OUT}$. The converter stage 1 includes an electronic switch 11 (which is also referred to as first electronic switch herein further below) connected in series with an inductor 12. The switch 11 is only schematically illustrated in FIG. 1. Any type of electronic switch may be used to implement the switch 11. Examples of the electronic switch 11 include, but are not restricted to, a MOSFET (Metal Oxide Semiconductor Field-Effect Transistor), an IGBT (Insulated Gate Bipolar Transistor), a HEMT (High Electron Mobility Transistor), in particular a Gallium-Nitride-(GaN)-HEMT, a BJT (Bipolar Junction Transistor), or the like.

Operation of the converter stage 1 is controlled by a control circuit 2. Controlling operation of the converter stage 1 by the control circuit 2 includes controlling operation of the switch 11 by generating a drive signal $S_{DRV}$ received by the switch 11, wherein the switch 11 switches on and off in accordance with this drive signal $S_{DRV}$. The arrangement with the converter stage 1 and the control circuit 2 is also referred to as a (first) power converter in the following.

Referring to FIG. 1, the control circuit 2 includes a hysteresis controller 3, and an operating point controller 4. The hysteresis controller 3 is configured to drive the switch 11, that is, to generate the drive signal $S_{DRV}$, based on a current measurement signal $S_{I12}$ representing a current I12 through the inductor 12, a first threshold signal $S_H$, and a second threshold signal $S_L$. The first threshold signal $S_H$ represents a first threshold, which is also referred to as upper threshold in the following, and the second threshold signal $S_L$ represents a second threshold, which is also referred to as lower threshold in the following. In the following, $S_H$ is used to denote both the first threshold signal and the first (upper) threshold it represents, and $S_L$ is used to denote both the second threshold signal and the second (lower) threshold it represents. According to one example, the current measurement signal $S_{I12}$, which represents the current I12 through the inductor 12, is proportional to the current through the inductor 12. The current measurement signal $S_{I12}$ can be generated using any type of current measurement circuit (not shown in the drawings) configured to measure the current through the inductor 12. Examples of such current measurement circuits include a current measurement circuit with a shunt resistor, a current measurement circuit with a Hall sensor, a current measurement circuit with an inductive current sensor, or the like.

The operating point controller 4 is configured to detect an operating point of the first converter stage and generate the first threshold signal $S_H$ and the second threshold signal $S_L$ based on the detected operating point. According to one example, the operating point is defined by at least one operating point signal $OP_1$, which is referred to as first operating point signal $OP_1$ in the following. In the example shown in FIG. 1, the operating point controller 4 receives the operating point signal $OP_1$ from an operating parameter controller 5. The operating parameter controller 5 is configured to receive at least a first operating parameter signal $S_{REG1}$ that represents a first operating parameter of the converter stage and a first setpoint signal $S_{SET1}$ associated with the first operating parameter. The setpoint signal $S_{SET1}$ defines a desired signal level of the first operating parameter. Further, the operating parameter controller 5 is configured to generate the first operating point signal $OP_1$ based on the first operating parameter $S_{REG1}$ signal and the first setpoint signal $S_{SET1}$.

The control circuit 2 is configured to drive the electronic switch 11 such that at least the first operating parameter represented by the first operating parameter signal $S_{REG1}$ is regulated in such a way that a level of the first operating parameter essentially equals a level that is represented by the first setpoint signal $S_{SET1}$. The first operating parameter may be the output voltage $V_{OUT}$. In this case, the first operating parameter signal represents a signal level of the output voltage $V_{OUT}$ and the first setpoint signal $S_{SET1}$ represents a desired signal level of the output voltage $V_{OUT}$. Regulating the output voltage $V_{OUT}$, however, is only an example. Other examples are explained herein further below.

According to one example, the control circuit 2 is configured to regulate the first operating parameter by regulating the input power of the converter stage 1. Regulating the input power is equivalent to regulating the output power, wherein the output power equals the input power minus inevitable power losses occurring in the converter stage 1. The control circuit 2 regulates the input power by controlling the currents I12 through the inductor 12. The inductor current I12, in turn, is controlled by a switched mode operation of the electronic switch 11. The switched mode operation of the electronic switch 11 includes operating the electronic switch 11 based on the drive signal $S_{DRV}$ in a plurality of successive drive cycles, with each drive cycle including an on-period $T_{ON}$ in which the at least one electronic switch 11 is switched on and an off-period $T_{OFF}$ in which the electronic switch 11 is switched off.

Figure 2:
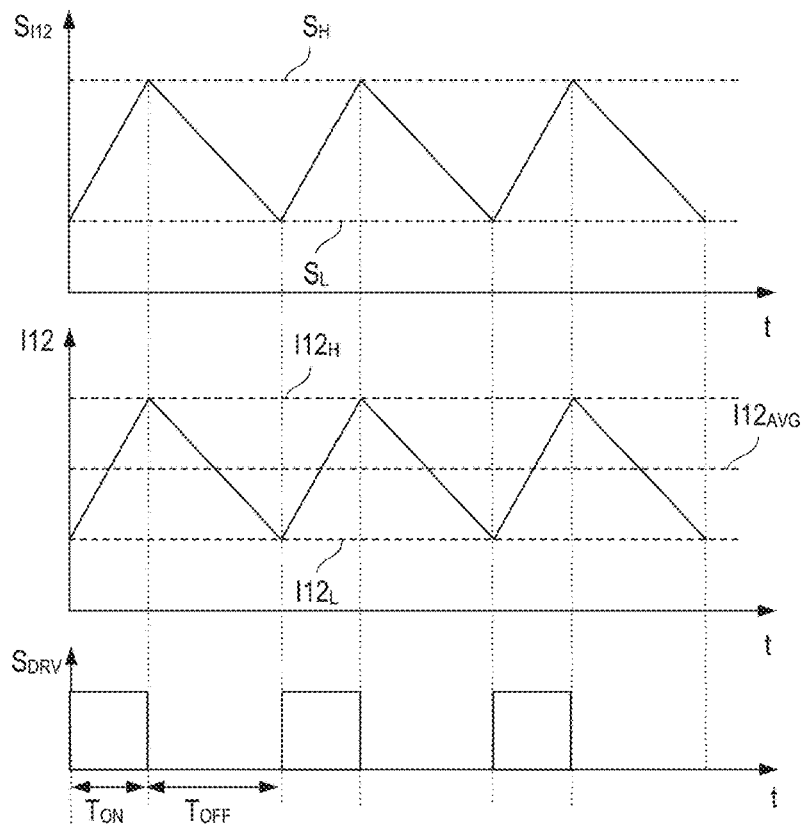
FIG. 2 shows examples of signal waveforms of a drive signal of the electronic switch, a current through the inductor, and a current measurement signal.

FIG. 2 schematically shows a signal waveform of the drive signal $S_{DRV}$ in order to illustrate operation of the electronic switch 11 in several successive drive cycles each including an on-period $T_{ON}$ and an off-period $T_{OFF}$. The drive signal $S_{DRV}$ has an on-level during the on-period and an off-level during the off-period. Just for the purpose of illustration, the on-level is a high signal level and the off-level is a low signal level in the example shown in FIG. 2. The duration of one drive cycle is referred to as cycle period $T_S$ in the following, and the reciprocal of the cycle period $T_S$ is referred to as switching frequency $f_S$, which is the frequency at which the electronic switch 11 switches on. In the converter stage 1, the electronic switch 11 and the inductor 12 are coupled between the input $1_{IN1}$, $1_{IN2}$ and the output $1_{OUT1}$, $1_{OUT2}$ such that the current through the inductor 12 increases during the on-period $T_{ON}$ and decreases during the off-period $T_{OFF}$. This is also illustrated in FIG. 2 that shows a signal waveform of the current measurement signal $S_{I12}$ representing the inductor current I12. According to one example, the current measurement signal $S_{I12}$ is proportional to the inductor current I12. Examples of how the electronic switch 11 and the inductor 12 can be connected between the input $1_{IN1}$, $1_{IN2}$ and the output $1_{OUT1}$, $1_{OUT2}$ in order to have an increasing inductor current I12 during the on-period and a decreasing inductor current during the off-period are explained herein further below. A slope of the inductor current I12 during the on-period is referred to as $m_{ON}$ in the following, and a slope of the inductor current I12 during the off-period is referred to as $m_{OFF}$ in the following. These slopes may be dependent on the voltage level of at least one of the input voltage $V_{IN}$ and the output voltage $V_{OUT}$.

Referring to FIG. 2, the hysteresis controller 3 generates the drive signal $S_{DRV}$ such that the electronic switch 11 switches off when the current measurement signal $S_{I12}$, during the on-period $T_{ON}$, reaches the upper threshold $S_H$ and that the electronic switch 11 switches on when the current measurement signal $S_{I12}$, during the off-period $T_{OFF}$, reaches the lower threshold $S_L$. The upper threshold $S_H$ is associated with a maximum current level $I12_H$ of the inductor current I12 during one drive cycle, and the lower threshold $S_L$ is associated with a minimum current level $I12_L$ of the inductor current I12 during one drive cycle. The maximum current level $I12_H$ and the minimum current level $I12_L$ define an average current level $I12_{AVG}$ of the inductor current I12 during one drive cycle and during a plurality of successive drive cycles in which the same lower threshold $S_L$ and upper threshold $S_H$ are used to control operation of the electronic switch 11. According to one example, and as shown in FIG. 2, the inductor current I12 increases essentially linearly during the on-period $T_{ON}$ and decreases essentially linearly during the off-period. In this case, the average inductor current $I12_{AVG}$ is given by the arithmetic average of the maximum current level $I12_H$ as represented by the upper threshold $S_H$ and the minimum current level $I12_L$ as represented by the lower threshold $S_L$, that is, $$I12_{AVG} = \frac{I12_H + I12_L}{2}. \tag{1}$$

According to one example, the first operating point signal $OP_1$ generated by the operating parameter controller 5 and received by the operating point controller 4 represents the (desired) average inductor current $I12_{AVG}$. In this case, the operating point controller 4 generates the first and the second threshold $S_L$, $S_H$ such that the average inductor current $I12_{AVG}$ is in accordance with the first operating point signal $OP_1$. As can be seen from equation (1), for each level of the average inductor current $I12_{AVG}$ a plurality of pairs of values each including a maximum current level $I12_H$ and an associated minimum current level $I12_L$ can be found that meet equation (1). This is illustrated in FIG. 3.

Figure 3:
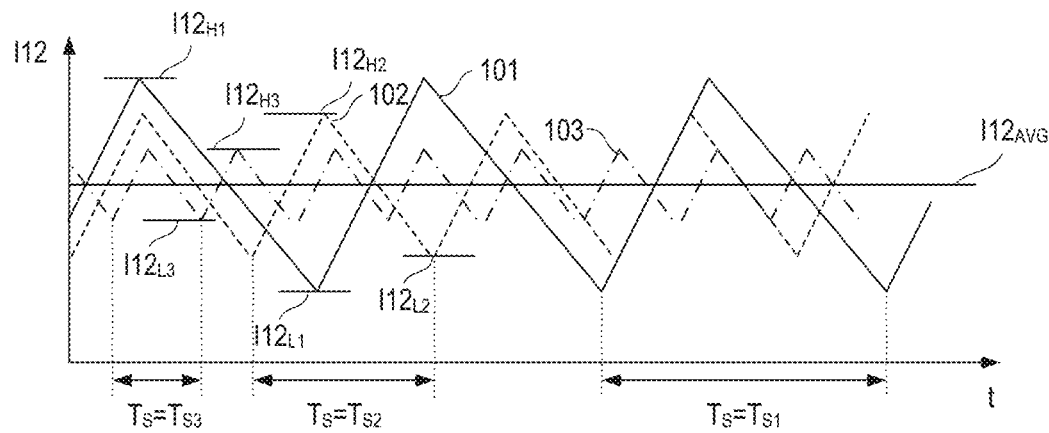
FIG. 3 shows examples of different current waveforms of the inductor current that have the same average current level.

FIG. 3 shows three examples of current waveforms of the inductor current I12 that have the same average current level $I12_{AVG}$. A first waveform 101 is obtained by selecting the upper and lower threshold $S_H$, $S_L$ such that the inductor current I12 oscillates between a first maximum level $I12_{H1}$ and a first minimum level $I12_{L1}$, a second waveform 102 is obtained by selecting the upper and lower threshold $S_H$, $S_L$ such that the inductor current I12 oscillates between a second maximum level $I12_{H2}$ and a second minimum $I12_{L2}$, and a third waveform 103 is obtained by selecting the upper and lower threshold $S_H$, $S_L$ such that the inductor current I12 oscillates between a third maximum level $I12_{H3}$ and a third minimum level $I12_{L3}$. These maximum and minimum current level pairs are such that they result in different cycle periods. In general, a duration of the cycle period $T_S$ decreases and, consequently, the switching frequency $f_S$ increases as a difference between the maximum level $112H$ and the corresponding minimum level $I12_L$ decreases. This difference $\Delta I12 = I12_H - I12_L$ is referred to as current swing or peak-to-peak value in the following. From the three waveforms shown in FIG. 3, the first waveform 101 has the largest peak-to-peak value and, therefore, the longest cycle period $T_{S1}$, the third waveform 103 has the smallest peak-to-peak value and, therefore, the shortest cycle period $T_{S3}$. A peak-to-peak value of the second waveform 102 is between the peak-to-peak values of the first waveform 101 and the third waveform 103, so that a second cycle period $T_{S2}$ is between the first cycle period $T_{S1}$ and the third cycle period $T_{S3}$.

During operation of the power converter circuit, power losses occur. These power losses include, for example, conduction losses, switching losses or losses in the inductor such as hysteresis and eddy current core losses. Conduction losses are losses due to ohmic resistances in conductors (such as PCB traces, inductor winding, or the like) and the electronic switch 11, for example. Switching losses are losses associated with the switched mode operation of the at least one electronic switch 11. For instance, switching losses are associated with charging and discharging parasitic capacitances of the electronic switch 11. One such parasitic capacitance of the electronic switch 11 is illustrated in dashed lines in FIG. 1. This capacitance is charged when the electronic switch 11 switches off and a voltage across the electronic switch 11 increases, and is discharged when the electronic switch 11 switches on and the voltage across the electronic switch 11 essentially decreases to zero. Hysteresis and eddy current core losses are losses associated with magnetizing and demagnetizing the inductor 12 when the inductor current I12 increases or decreases. The conduction losses, for example, are proportional to the square of the inductor current I12. From this perspective it may be desirable to avoid high maximum currents levels when adjusting a certain current level of the average inductor current I12$_{AVG}$. Avoiding high maximum currents is equivalent to selecting a small peak-to-peak value. Selecting a small peak-to-peak value, however, results in a high switching frequency. Switching losses, however, increase as the switching frequency increases. These switching losses also include power consumed by the control circuit for driving the electronic switch 11. On the other hand, the losses in the inductor 12 decrease as the switching frequency decreases.

In general, it is desirable to minimize power losses that occur during operation of the power converter circuit. However, due to different types of power losses that occur and due to the complex nature of these power losses, it is difficult to find an analytical approach which, for each average current level that may occur during operation of the power converter circuit, finds a peak-to-peak value and a switching frequency, respectively, that minimizes the power losses occurring at the respective average current level. According to one example, a mapping of an operating point of the power converter circuit to the first and second threshold signal $S_H$, $S_L$ performed by the operating point controller 4 is therefore based on experimental results and/or simulations. "Mapping the operating point to the first and second threshold signals $S_H$, $S_L$", according to one example, includes detecting the operating point of the converter stage based at least on the first operating point signal OP$_1$ and outputting the first and second threshold signals $S_H$, $S_L$ associated with the detected operating point by the operating point controller 4. This is illustrated in FIG. 4.

Figure 4:
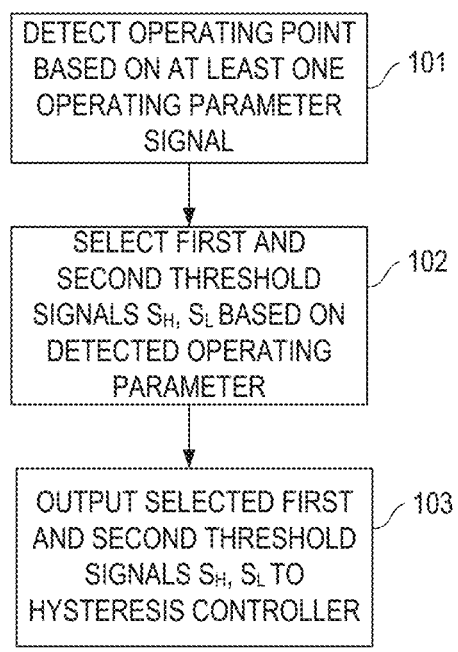
FIG. 4 shows a flowchart that illustrates a function of the operating point controller.

FIG. 4 shows a flowchart of the operation of the operating point controller 4. Referring to FIG. 4, the operation point controller 4 detects the operating point based on at least one operating point signal, such as the first operating point signal OP$_1$ explained above (see 101 in FIG. 4). Further, based on the detected operating point, the operating point controller 4 maps the detected operating point to first and second threshold signals $S_H$, $S_L$ associated with the detected operating point (see 102 in FIG. 4), and outputs the first and second threshold signal $S_H$, $S_L$ to the hysteresis controller (see 103 in FIG. 4).

According to one example, the operating point controller 4 includes a look-up table (LUT) 4a that holds the individual first and second threshold values associated with the individual operating points. Theoretically, the power converter circuit can be operated in an infinite number of different operating points as there is an infinite number of different average inductor current levels. An operating point of the power converter circuit may therefore be defined by intervals of the first operating point signal OP$_1$. For example, the power converter circuit is in a first operating point when a signal value of the first operating point signal OP$_1$ is between a first value and a second value, the power converter circuit is in a second operating point when a signal value of the first operating point signal OP$_1$ is between the second value and a third value, and so on. According to one example, the operating point is not only dependent on the first operating point signal OP$_1$ which, for example, represents the average inductor current, but is further dependent on at least one further operating point signal. In this case, the operating point controller 4 detects the operating point based on at least two operating parameter signals and maps the detected operating point to the first and second threshold signals associated with the detected operating point.

Figure 5:
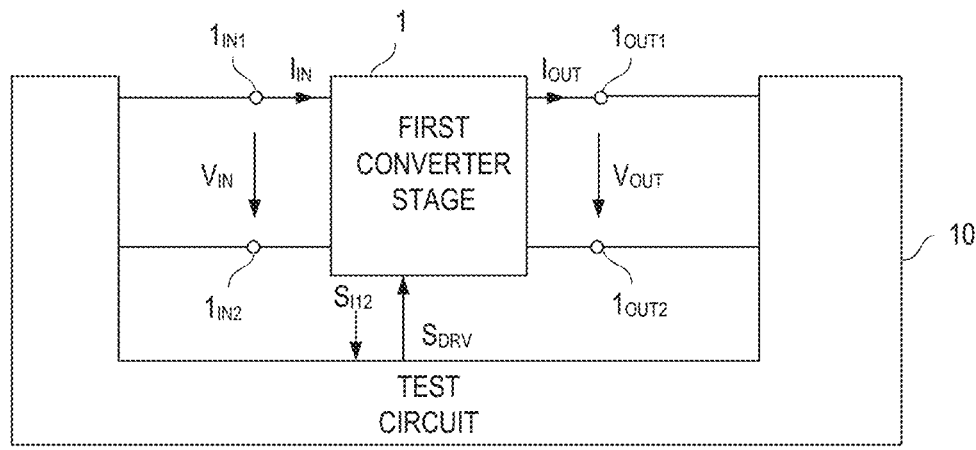
FIG. 5 illustrates a test setup for detecting optimum first and second current thresholds of the hysteresis controller in different operating points of the converter stage.
Figure 6:
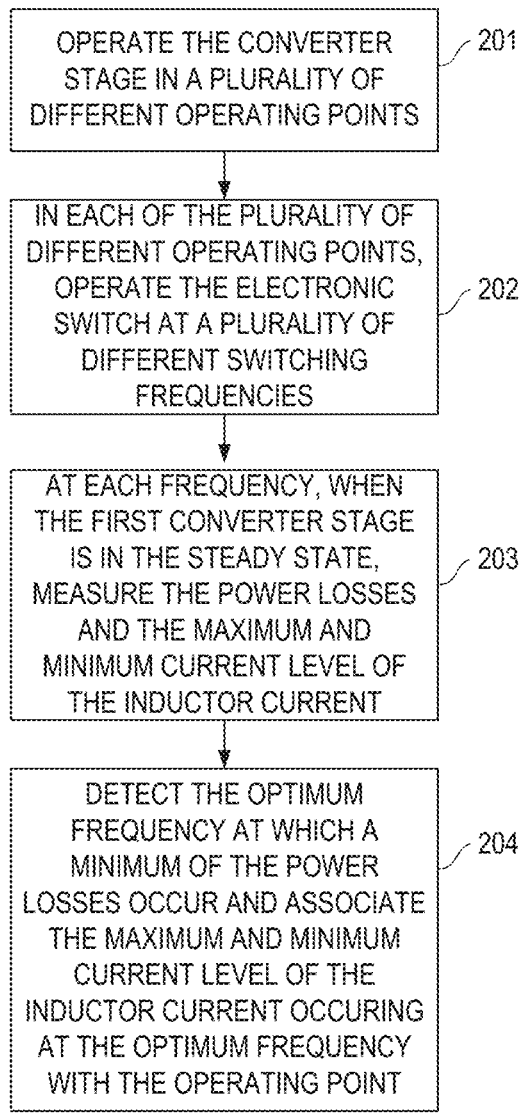
FIG. 6 shows a flowchart that illustrates one example of a testing routine.

One example of how the first and second thresholds $S_H$, $S_L$ associated with the individual operating points may be obtained is explained with reference to FIGS. 5 and 6 below. FIG. 5 schematically illustrates a test setup with a test circuit, and FIG. 6 shows a flowchart that illustrates how the test circuit may operate. Referring to FIG. 5, the test circuit 10 is connected to the input $1_{IN1}$, $1_{IN2}$ and the output $1_{OUT1}$, $1_{OUT2}$ of the converter stage 1, receives the current measurement signal $S_{I12}$ and generates the drive signal $S_{DRV}$ received by the electronic switch (not shown in FIG. 5) included in the converter stage 1. The test circuit 10 is configured to operate the converter stage 1 in different operating points, vary the switching frequency of the electronic switch 11 in each of these operating points, detect an optimum switching frequency at which power losses occurring in the converter stage 1 reach a minimum, and detect the maximum inductor current and the minimum inductor current occurring at the optimum switching frequency. This optimum switching frequency is referred to as optimum frequency $f_{S,\,opt}$ in the following.

The test circuit 10 shown in FIG. 5 provides the input voltage $V_{IN}$ and the input current $I_{IN}$, which define the input power received by the converter stage 1. Further, the test circuit 10 acts as a load that draws the output current $I_{OUT}$ from the converter stage 1, wherein the output voltage $V_{OUT}$ and the output current $I_{OUT}$ define the output power of the converter stage 1. The test circuit 10 further includes a power analyzer that measures the input power and the output power and, based on the measured input power and the measured output power, calculates the power losses. These power losses may be calculated by subtracting a value representing the output power from a value representing the input power and additionally adding a value representing power required in the test circuit 10 for generating the drive signal $S_{DRV}$. That is, $$P_{LOSS}=P_{IN}+P_{DRV}-P_{OUT},$$

where $P_{LOSS}$ denotes the power losses, $P_{IN}$ denotes the input power, $P_{OUT}$ denotes the output power and $P_{DRV}$ denotes the power required for driving the electronic switch 11 and any other active devices in the power converter circuit such as an active rectifier element. According to one example, operating the converter stage 1 in one operating point by the test circuit 10 includes generating a fixed input voltage $V_{IN}$ by the test circuit and drawing a constant output current $I_{OUT}$ from the converter stage 1 by the test circuit 10, and regulating the output voltage $V_{OUT}$ to be constant. Regulating the output voltage $V_{OUT}$ includes regulating a duty cycle of the drive signal $S_{DRV}$ such that the output voltage $V_{OUT}$ reaches a predefined set value. The "duty cycle" of the drive signal $S_{DRV}$ is a ratio between a duration of the on-period ($T_{ON}$ in FIG. 2) and the duration $T_S$ of the drive cycle period. Referring to the above, in each operating point, the test circuit 10 generates the drive signal $S_{DRV}$ with several different switching frequencies, wherein the reciprocal of each switching frequency is the respective cycle period. At each of these different switching frequencies the test circuit 10 operates the converter stage 1 until the output voltage $V_{OUT}$ has been regulated to the desired set value, that is, until the converter stage 1 is in the steady state. In the steady state, which is when the duty cycle of the drive signal $S_{DRV}$ has been adjusted such that the output voltage $V_{OUT}$ is constant and has reached the desired set value, the maximum value and the minimum value of the inductor current I12 are measured. The maximum and minimum inductor current values that are measured at the optimum frequency $f_{S,opt}$ are then associated with the operating point in which the converter stage 1 is operated.

The test circuit 10 operates the converter stage 1 in a plurality of different operating points, detects the optimum frequency $f_{S,opt}$ in each of these operating points and detects the maximum and minimum inductor current values occurring at the respective optimum frequency $f_{S,opt}$, so that a plurality of operating points and associated maximum and minimum inductor current values are obtained. Based on these maximum and minimum inductor current values associated with the individual operating points the first and second threshold values $S_H$, $S_L$ implemented in the operating point controller 4 are obtained.

The test procedure performed by the test circuit 10 is schematically illustrated in a flow chart shown in FIG. 6. Referring to FIG. 6, testing the converter stage 1 includes operating the converter stage in a plurality of different operating points (201), and, in each of the plurality of different operating points, operating the electronic switch 11 at a plurality of different switching frequencies (202). At each of these different frequencies, when the converter stage is in the steady state, the power losses and the maximum current level and the minimum current level of the inductor current are determined (203). Further, in each operating point, the switching frequency is detected at which a minimum of the power losses occurs. This frequency is the optimum switching frequency $f_{S,\ opt}$. The maximum and minimum current level detected at the optimum switching frequency $f_{S,\ opt}$ are associated with the respective operating point and are used to generate the first threshold and the second threshold $S_H$, $S_L$ associated with the operating point. According to one example, the first threshold and the second threshold $S_H$, $S_L$ are generated to be proportional to detected maximum and minimum current levels.

Figure 7:
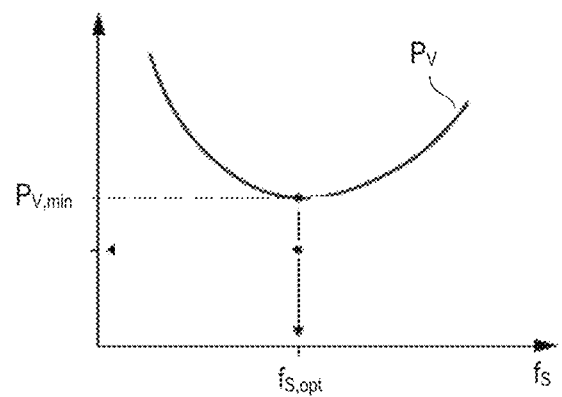
FIG. 7 illustrates how an optimum switching frequency associated with one operating point may be obtained based on the results obtained in the testing procedure.

Finding the optimum switching frequency $f_{S,\ opt}$ by the test circuit 10 is schematically illustrated in FIG. 7. FIG. 7 schematically illustrates the power losses $P_V$ measured in one operating point dependent on the switching frequency $f_S$. Referring to FIG. 7, the optimum switching frequency $f_{S,\ opt}$ is the switching frequency at which a minimum $P_{V,min}$ of the power losses $P_V$ occurs, wherein these losses increase when the switching frequency is lower than the optimum switching frequency and increase when the switching frequency is higher than the optimum switching frequency.

Figure 8:
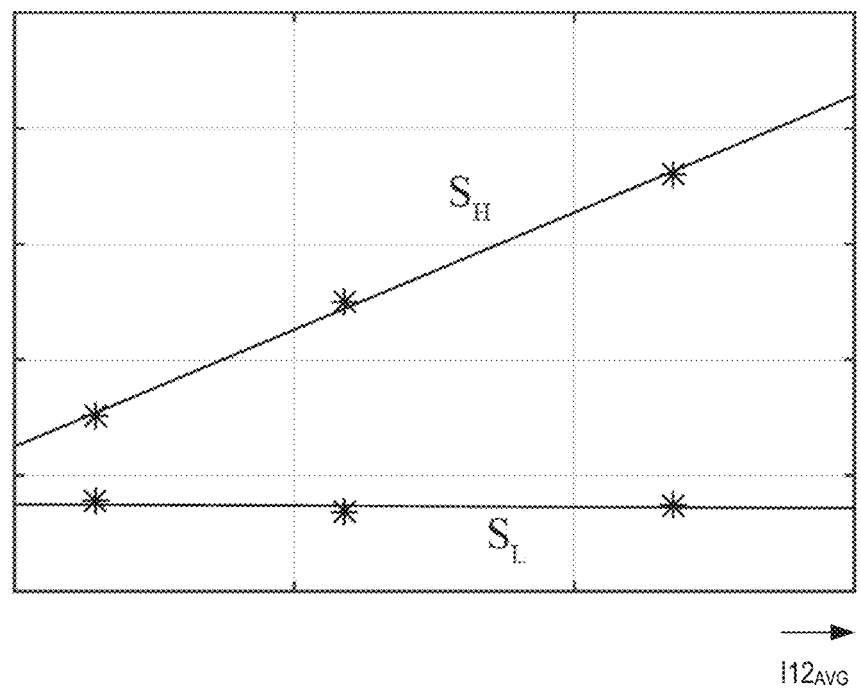
FIG. 8 shows diagrams that illustrate a switching frequency and first and second current thresholds associated with different operating points obtained by the testing routine.

As an example, FIG. 8 illustrates the first threshold $S_H$ and the second threshold $S_L$ that were obtained by testing an example power converter circuit in accordance with the method explained with reference to FIGS. 5 to 7. FIG. 8 shows the first and second thresholds $S_H$, $S_L$ dependent on the average inductor current $I12_{AVG}$. These first and second threshold were obtained in a test scenario in which the test circuit 10 kept the input voltage $V_{IN}$ and the output voltage $V_{OUT}$ essentially constant and varied the average inductor current $I_{AVG}$ by varying the output current $I_{OUT}$. At each output current level, the test circuit 10 varied the switching frequency in order to find the optimum switching frequency $f_{S,opt}$. The first and second threshold levels $S_H$, $S_L$ shown in FIG. 8 represent the first and second threshold levels obtained at the respective optimum switching frequency $f_{S,opt}$.

Based on curves of the first and second threshold $S_H$, $S_L$, such as curves of the type shown in FIG. 8, obtained under test conditions or by simulations the operating point controller 4 can be programmed. To "program" may include programming a look-up table implemented in the operating point controller. According to another example, programming the operating point controller includes finding a first function that approximates the curve of the first threshold $S_H$ and a second function that approximates the curve of the second threshold $S_L$ and implementing these functions in the operating point controller 4 such that the operating point controller is configured to calculate the first and second threshold levels $S_H$, $S_L$ based on these functions dependent on the operating point as represented at least by the first operating point signal. According to another example, the operating point controller includes a look-up table and a calculation unit. If, for example, an operating point is between a first operating point and a second operating point for each of which the look-up table holds a respective pair of first and second threshold levels $S_H$, $S_L$, the first and second threshold signals output by the operating point controller 4 may be calculated by the calculation unit based on the first and second threshold signals associated with the first and second operating points.

Curves of the first and second thresholds $S_H$, $S_L$ may be obtained by determining the first and second thresholds $S_H$, $S_L$ at the optimum switching frequency $f_{S,opt}$ at several operating points and determining the first and second thresholds $S_H$, $S_L$ associated with other operating points by interpolation.

Just for the purpose of illustration, the example shown in FIG. 8 is based on the assumption that the operating point is only defined by an average inductor current $I12_{AVG}$. However, as explained herein further below, the operating point may be dependent on further operating parameters, such as the input voltage and the output voltage. In this case, the curves representing the first and the second threshold levels $S_H$, $S_L$ may be represented by functions with more than one variable.

The converter stage 1 may be implemented in various ways. That is, there is a variety of different topologies that may be used to implement the converter stage 1. Some examples of these topologies are explained herein further below. Further, each topology may be implemented with different types of electronic components. That is, one and the same topology may be implemented with different types of electronic switches, different types of inductors, and so on. In the following, "one type of converter stage" is a converter stage with a certain topology and with a certain set of electronic components used to implement the topology. The test or simulation procedure explained with reference to FIG. 5 may be applied to one sample of a certain type of converter stage, wherein the first and second threshold values obtained by testing the sample example may then be applied to any other converter stage of the same type. A manufacturer may therefore obtain by test and/or simulation the plurality of first and second thresholds $S_H$, $S_L$ for one type of power converter circuit only once and use these first and second thresholds $S_H$, $S_L$ to program the operating point controllers of a plurality of power converter circuits of this type.

Figure 9:
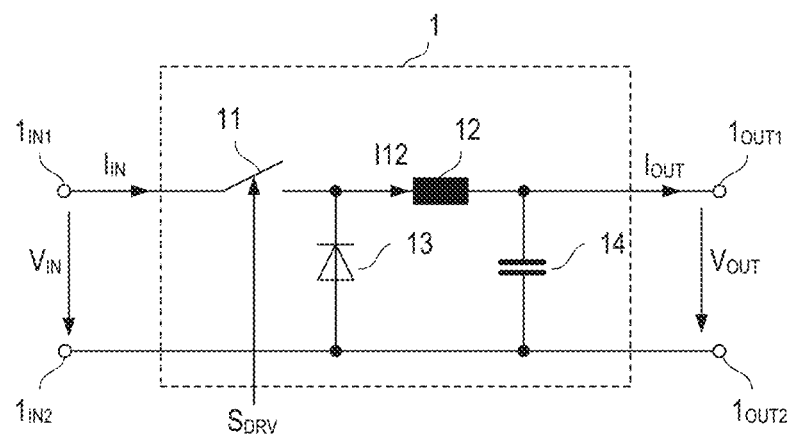
FIG. 9 shows one example of a converter stage implemented with a buck topology.
Figure 10:
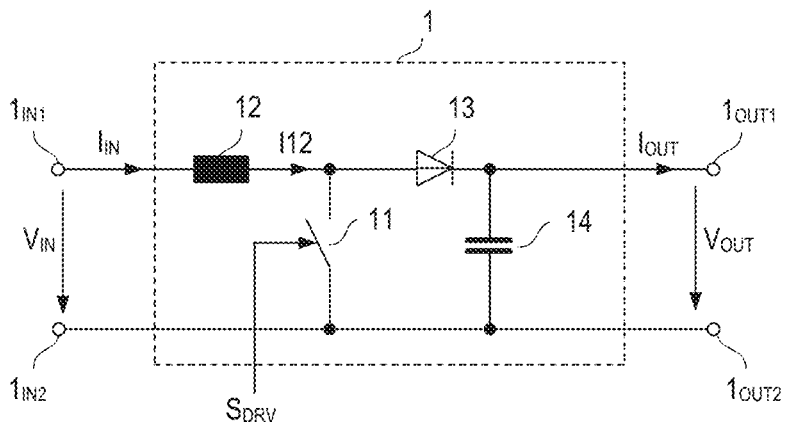
FIG. 10 shows one example of a converter stage implemented with a boost topology.

Referring to the above, the converter stage 1 may be implemented in different ways. Two examples of how the converter stage 1 may be implemented are shown in FIGS. 9 and 10. FIG. 9 shows the converter stage 1 implemented with a buck converter topology and FIG. 10 shows the converter stage 1 implemented with a boost converter topology. The converter stage 1, however, is not restricted to be implemented in accordance with one of these examples.

Referring to FIG. 9, in the converter stage 1 with the buck converter topology (buck topology), a series circuit with the electronic switch 11, the inductor 12 and a capacitor 14 is connected between the first input node $1_{IN1}$ and the second input node $1_{IN2}$ of the converter stage 1. The output voltage $V_{OUT}$ is available across the capacitor 14, which is connected between the first output node $1_{OUT1}$ and the second output node $1_{OUT2}$, wherein the second input node $1_{IN2}$ and the second output node $1_{OUT2}$ or of the converter stage 1 are formed by the same circuit node. Further, a rectifier element 13 is connected in parallel with a series circuit including the inductor 12 and the capacitor 14. When the electronic switch 11 is driven by a drive signal $S_{DRV}$ as shown in FIG. 2 that includes a plurality of successive drive cycles each including an on-period $T_{ON}$ and an off-period $T_{OFF}$ the inductor current I12 increases during the on-period $T_{ON}$, that is, when the electronic switch 11 is switched on, and decreases during the off-period. The slope $m_{ON}$ of the inductor current I12 during the on-period $T_{ON}$ is substantially given by a voltage across the inductor 12 divided by an inductance L of the inductor 12. During the on-time, the voltage across the inductor 12 is given by the input voltage $V_{IN}$ minus the output voltage $V_{OUT}$ (wherein a voltage level of the input voltage $V_{IN}$ is higher than the voltage level of the output voltage $V_{OUT}$), so that the slope during the on-time is given by $$m_{ON} = \frac{V_{IN} - V_{OUT}}{L}. \quad (2a)$$

During the off-period, the voltage across the inductor 12 substantially equals the negative output voltage $-V_{OUT}$, so that the absolute value of the slope $m_{OFF}$ is given by $$m_{OFF} = -\frac{V_{OUT}}{L}. \quad (2b)$$

Referring to equations (2a) and (2b), the input voltage $V_{IN}$ and the output voltage $V_{OUT}$ define the slopes of the inductor current. These slopes affect the switching frequency. That is, at one first threshold $S_H$ and a corresponding second threshold $S_L$ the switching frequency is dependent on the current slopes, wherein the frequency increases as the slopes are getting steeper. Thus, in a converter stage with a buck topology the operating point, besides the average inductor current $I12_{AVG}$, is defined by the input voltage $V_{IN}$ and the output voltage $V_{OUT}$. The operating point controller 4 in this case receives a second operating point signal representing the output voltage $V_{OUT}$ and a third operating point signal representing the input voltage $V_{IN}$ additionally to the first operating point signal $OP_1$ representing the average inductor current, wherein the three operating point signals represent the operating point.

Referring to FIG. 10, in the converter stage 1 with boost topology, a series circuit with the inductor 12 and the electronic switch 11 is connected between the first input node $1_{IN1}$ and the second input node $1_{IN2}$ of the converter stage 1. A series circuit with the rectifier element 13 and the capacitor 14 is connected in parallel with the electronic switch 11. The output voltage $V_{OUT}$, like in the buck topology shown in FIG. 9, is available across the capacitor 14. Like in the buck topology, the second input node $1_{IN2}$ and the second output node $1_{OUT2}$ are formed by the same circuit node in the boost topology. During the on-period $T_{ON}$, that is, when the electronic switch 11 is switched on, a voltage across the inductor 12 substantially equals the input voltage $V_{IN}$, so that the slope of the inductor current I12 during the on-period is given by the input voltage $V_{IN}$ divided by the inductance L, that is.

$$m_{ON} = \frac{V_{IN}}{L}. \quad (3a)$$

During the off-period $T_{OFF}$, that is, after the electronic switch 11 has been switched off, the voltage across the inductor 12 equals the input voltage $V_{IN}$ minus the output voltage $V_{OUT}$. The slope of the inductor current I12 during the off-time is therefore given by $$m_{OFF} = \frac{V_{IN} - V_{OUT}}{L}. \quad (3b)$$

The output voltage $V_{OUT}$ has a higher voltage level than the input voltage $V_{IN}$ in the power converter circuit with the boost topology. Referring to equations (3a) and (3b), the input voltage $V_{IN}$ and the output voltage $V_{OUT}$ define the slopes of the inductor current, so that the operating point, besides the average inductor current $I12_{AVG}$, is defined by the input voltage $V_{IN}$ and the output voltage $V_{OUT}$.

Figure 11:
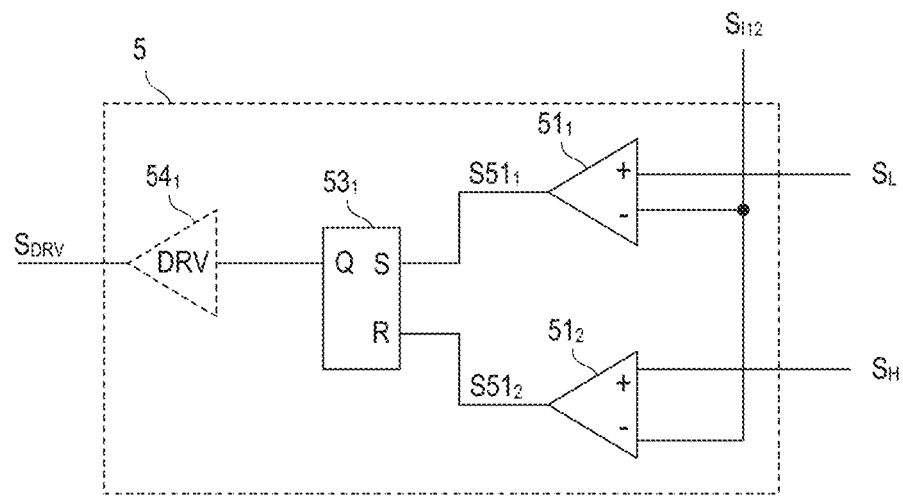
FIG. 11 shows one example of the hysteresis controller.

FIG. 11 illustrates one example of the hysteresis controller 5 configured to generate the drive signal $S_{DRV}$ based on the first and second thresholds $S_H$, $S_L$ received from the operating point controller 4 and the current measurement signal $S_{I12}$. In this example, the hysteresis controller 5 includes a first comparator $51_1$ that receives the second threshold signal $S_L$ and the current measurement signal $S_{I12}$, and a second comparator $51_2$ that receives the current measurement signal $S_{I12}$ and the first threshold signal $S_H$. A flip-flop $53_1$ receives an output signal $S51_1$ of the first comparator $51_1$ at a first input S and an output signal $S51_2$ of the second comparator $51_2$ at a second input R. In this example, the first input S of the flip-flop $53_1$ is a set input and the second input R is a reset input. The drive signal $S_{DRV}$ is available at an output Q of the flip-flop $53_1$. Just for the purpose of illustration, the output Q of the flip-flop $53_1$ is a non-inverting output in this example. Optionally, a driver $54_1$ receives the output signal of the flip-flop $53_1$ and generates the drive signal $S_{DRV}$ based on this output signal. The driver $54_1$ is configured to generate from the logic signal provided by the flip-flop $53_1$ a drive signal $S_{DRV}$ suitable to switch on and off the electronic switch 11. In the example shown in FIG. 11, the flip-flop $53_1$ is set by the output signal $S51_1$ of the first comparator $51_1$, in order to switch on the electronic switch 11, each time the current measurement signal $S_{I12}$ falls below the second threshold $S_L$. The flip-flop $53_1$ is reset in order to switch off the electronic switch 11 when the current measurement signal $S_{I12}$ reaches the first threshold $S_H$.

Figure 12:
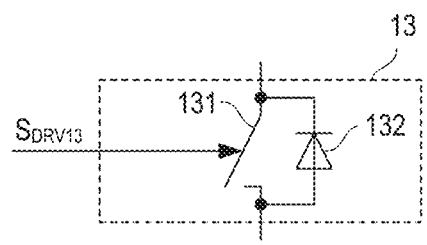
FIG. 12 shows one example of an active rectifier element with an electronic switch that may be used in the converter stage.

In the examples of the converter stage 1 shown in FIGS. 9 and 10 the rectifier element 13 is drawn as a passive rectifier element, in particular a bipolar diode. This, however, is only an example. According to another example, the rectifier element 13 is an active rectifier element. One example of an active rectifier element 13 is schematically illustrated in FIG. 12. This rectifier element 13 includes an electronic switch 131 that is controlled by a further drive signal $S_{DRV13}$ and a passive rectifier element 132 such as a bipolar diode or a Schottky-diode connected in parallel with the electronic switch 131. Such active rectifier element 13 with an electronic switch 131 and a passive rectifier element 132 connected in parallel with the electronic switch 131 may also be referred to as synchronous rectifier (SR).

Figures 13A, 13B:
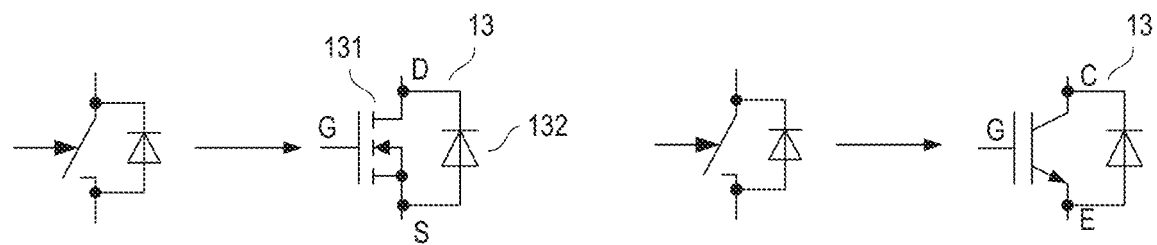
FIGS. 13A to 13C illustrate possible implementations of the rectifier element shown in FIG. 12.
Figure 13C:
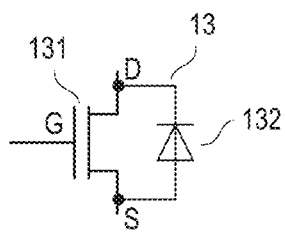

An active rectifier element 13 as shown in FIG. 12 may be implemented in various ways. Some examples are illustrated in FIGS. 13A to 13C. Referring to FIG. 13A, the active rectifier element 13 can be implemented as a MOSFET (Metal Oxide Semiconductor Field-Effect Transistor). In this case, the rectifier element 132 can be formed by an integrated diode, which is often referred to as body diode, or by an additional rectifier element connected in parallel with a drain-source path D-S of the MOSFET. Just for the purpose of illustration, the MOSFET is drawn as an n-type MOSFET in the example shown in FIG. 13A. However, a p-type MOSFET may be used as well. According to another example shown in FIG. 13B, the active rectifier element 13 may be implemented using an IGBT and a rectifier element connected in parallel with a collector-emitter path C-E of the IGBT. According to yet another example shown in FIG. 13C, the active rectifier element 13 may be implemented using a HEMT (High Electron-Mobility Transistor) such as a gallium nitride-(GaN)-HEMT. The passive rectifier element 132 may be an inherent rectifier element, similar to the body diode in a MOSFET, and/or an additional passive rectifier element.

Figure 14:
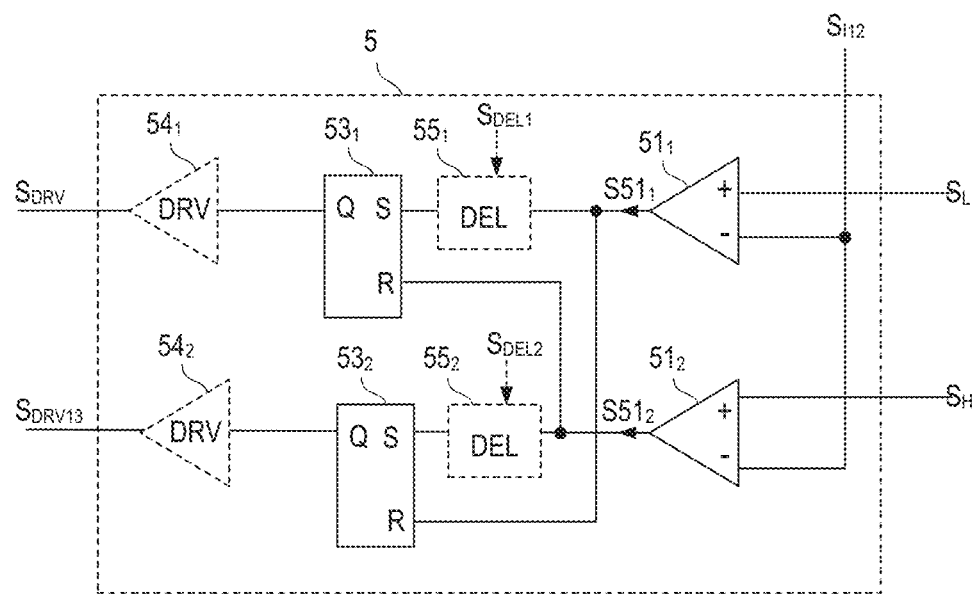
FIG. 14 shows a modification of the hysteresis controller shown in FIG. 11.

FIG. 14 shows one example of a hysteresis controller 5 configured to drive the electronic switch 11 by the drive signal $S_{DRV}$ and the active rectifier element 13 by the further drive signal $S_{DRV13}$. The hysteresis controller 5 shown in FIG. 14 is based on the hysteresis controller shown in FIG. 11 and additionally includes a further flip-flop $53_2$ that generates the further drive signal $S_{DRV13}$. Optionally, a drive circuit $54_2$ generates the further drive signal $S_{DRV13}$ from an output signal of the further flip-flop $53_2$. The further flip-flop $53_2$ receives the output signal $S51_2$ of the second comparator $51_2$ at a first input and the output signal $S51_1$ of the first comparator $51_1$ at a second input. The first input S is a set input and the second input R is a reset input in this example. The hysteresis controller 5 shown in FIG. 14 is configured to drive the electronic switch 11, which is also referred to as first electronic switch in the following, and the electronic switch 131, which is also referred to as second electronic switch in the following, of the active rectifier element 13 such that only one of the first electronic switch 11 and the second electronic switch in the active rectifier element 13 is switched on at the same time. In the example shown in FIG. 14 this is achieved in that the first comparator signal $S51_1$ resets the further flip-flop $53_2$ in order to switch off the active rectifier element 13 and sets the first flip-flop $53_1$ in order to switch on the electronic switch 11. Equivalently, when the second comparator signal $S51_2$ sets the second flip-flop $53_2$ in order to switch on the active rectifier element 13 it resets the first flip-flop $53_1$ in order to switch off the electronic switch 11. Optionally, a first delay element $55_1$ is connected between the first comparator $51_1$ and the first input S of the first flip-flop $53_1$, and a second delay element $55_2$ is connected between the second comparator $51_2$ and the first input of the second flip-flop $53_2$. The first delay element $55_1$ causes a delay time between a time instance when the first comparator signal $S51_1$ resets the second flip-flop $53_2$ in order to switch off the active rectifier element 13, that is, to switch off the second electronic switch, and a time instance when the first flip-flop $53_1$ is set in order to switch on the electronic switch. Equivalently, the second delay element $55_2$ causes a delay time between a time instance when the first flip-flop $53_1$ is reset in order to switch off the first electronic switch 11 and a time instance when the second flip-flop $53_2$ is set in order to switch on the second electronic switch in the active rectifier element 13. These delay elements $55_1$, $55_2$ therefore cause a delay time between time instances when one of the first electronic switch 11 and the rectifier element 13 with the second electronic switch switches off and the other one of the first electronic switch 11 and the active rectifier element 13 with the second electronic switch switches on in order to prevent that the first electronic switch 11 and the active rectifier element 13 are switched on at the same time. After the first electronic switch 11 has been switched off and before the second electronic switch 131 switches on, for example, a current may flow through the passive rectifier element 132 of the active rectifier element 13.

Figure 15:
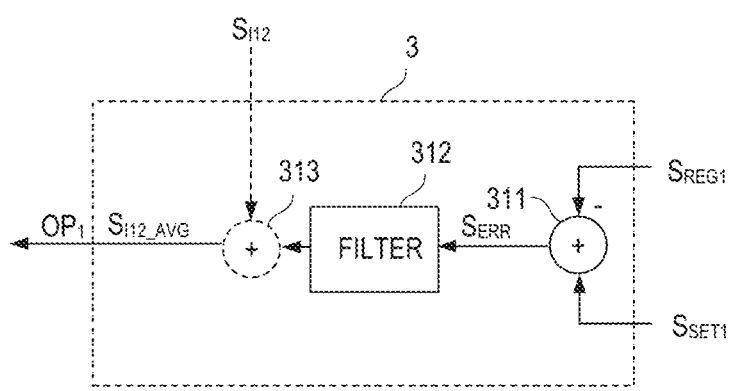
FIG. 15 shows one example of an operating parameter controller that may be implemented in the control circuit.

One example of the operating parameter controller 3 is shown in FIG. 15. In this example, the operating parameter controller 3 receives one operating parameter signal $S_{REG1}$ and a corresponding setpoint signal $S_{SET1}$. The operating parameter signal $S_{REG1}$ represents the operating parameter that is to be regulated. The operating parameter signal represents, for example, the output voltage $V_{OUT}$ or the input voltage $V_{IN}$ of the converter stage 1 and can be obtained by measuring the respective operating parameter using a suitable measurement circuit such as a voltage measurement circuit. Referring to FIG. 15, the operating parameter controller 3 includes a calculation unit 311 that generates an error signal $S_{ERR}$ by calculating a difference between an instantaneous signal level of the operating parameter signal $S_{REG1}$ and the signal level of the setpoint signal $S_{SET1}$. A filter 312 receives the error signal $S_{ERR}$ and outputs the first operating point signal $OP_1$. Referring to the above, this first operating point signal $OP_1$, which is also referred to as $S_{I12\_AVG}$ in the example shown in FIG. 15, represents the desired average current level $I12_{AVG}$ of the inductor current I12. An operating parameter controller 3 of the type shown in FIG. 15 may be used in a DC/DC power converter circuit in which the converter stage 1 receives a direct input voltage $V_{IN}$ and generates a direct output voltage $V_{OUT}$ based on the direct input voltage.

Optionally, the operating parameter controller 3 includes a feed-forward loop with an adder 313 that adds a current measurement signal $S_{IOUT}$ representing the output current $I_{OUT}$ of the converter stage to the output signal of the filter 312. In this example, not the output signal of the filter 312 but an output signal of the adder 313 represents the desired level of the average inductor current $I12_{AVG}$, that is, is the first operating point signal $OP_1$. According to one example, the current measurement signal $S_{IOUT}$ is proportional to the inductor current I12. This current measurement signal $S_{IOUT}$ may be obtained by using any type of current measurement circuit.

Figure 16:
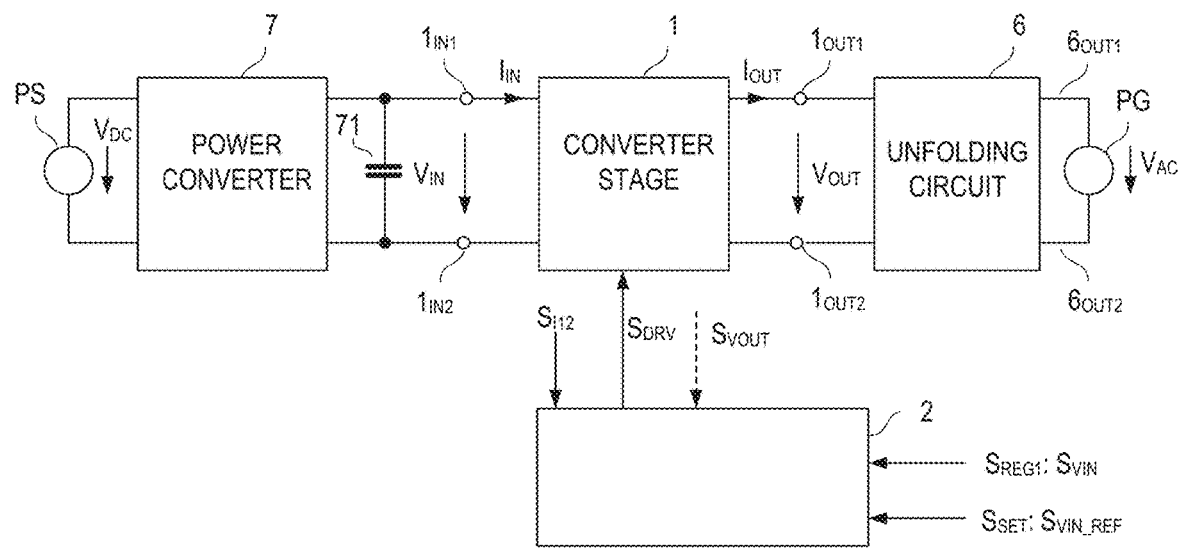
FIG. 16 shows an example of a power converter circuit that includes a second converter stage connected upstream the converter stage and an unfolding circuit connected downstream the converter stage.
Figures 17A, 17B, 17C:
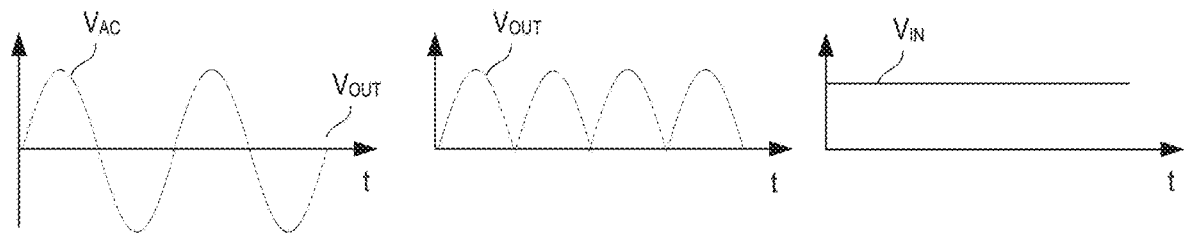
FIGS. 17A to 17C show timing diagrams that illustrate signal waveforms of signals occurring in the power converter circuit shown in FIG. 16.

FIG. 16 shows one example of a power converter circuit in which the first power converter with the converter stage 1 and the control circuit 2 is part of a DC/AC converter. This DC/AC converter, besides the converter stage 1 and the control circuit 2 includes an unfolding circuit 6 connected between the output $1_{OUT1}$, $1_{OUT2}$ of the converter stage 1 and a power grid PG. In this power converter circuit, the converter stage 1 drives the output current $I_{OUT}$ via the unfolding circuit 6 into the power grid PG, wherein the output voltage $V_{OUT}$ of the converter stage 1 is defined by an alternating voltage $V_{AC}$ provided by the power grid PG. Example waveforms of the alternating voltage $V_{AC}$ provided by the power grid, the output voltage $V_{OUT}$ of the converter stage 1, and the input voltage $V_{IN}$ of the converter stage 1 are shown in FIGS. 17A, 17B and 17C, respectively. The output voltage $V_{OUT}$ of the converter stage 1 is a rectified sinusoidal voltage in this example, wherein this rectified sinusoidal output voltage VOLT is provided by the unfolding circuit 6 based on the alternating voltage $V_{AC}$ of the power grid PG. According to one example, the control circuit 2 is configured to regulate the input voltage $V_{IN}$ and to generate the output current $I_{OUT}$ such that it is in phase with the output voltage $V_{OUT}$ as defined by the grid voltage $V_{AC}$. According to one example, the converter stage 1 has a buck topology as shown in FIG. 9. The input power received by the converter stage 1, which is given by the input voltage $V_{IN}$ multiplied with the input current $I_{IN}$ is supplied by a further power converter 7 from a power source PS. According to one example, the power source PS is a DC power source, such as a photovoltaic (PV) panel. The further power converter 7 may be configured to regulate the voltage $V_{DC}$ provided by the power source PS such that the power source PS operates in a maximum power point. Power converters configured to operate a DC load, such as a photovoltaic panel, in a maximum power point are commonly known, so that no further explanations are required in this regards.

Figure 18:
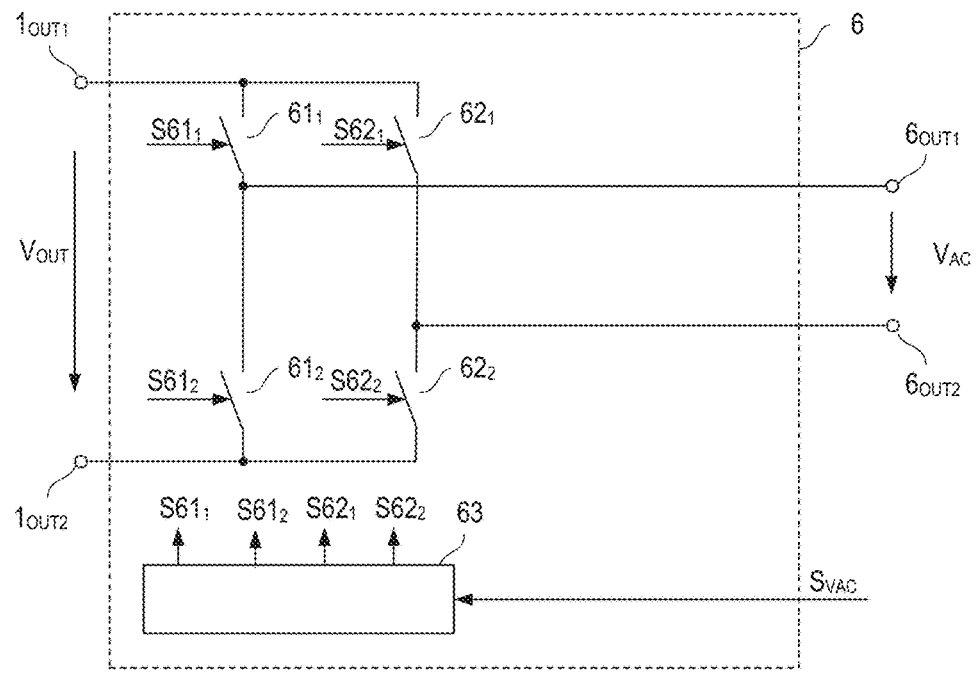
FIG. 18 shows one example of the unfolding circuit shown in FIG. 16.

One example of the unfolding circuit 6 is shown in FIG. 18. Referring to FIG. 18, the unfolding circuit includes a full bridge with two half bridges each including a high side switch $61_1$, $62_1$ and a low side switch $61_2$, $62_2$. Each of these half bridges is connected between the first output node $1_{OUT1}$ and the second output node $1_{OUT2}$ of the converter stage 1. An output of each half bridge is formed by a circuit node common to the high side switch $61_1$, $62_1$ and the low side switch $61_2$, $62_2$. The output of a first half bridge $61_1$, $61_2$ is connected to a first output node $6_{OUT1}$ of the unfolding circuit 6, and the output of a second half bridge $62_1$, $62_2$ is coupled to a second output node $6_{OUT2}$ of the unfolding circuit 6. The unfolding circuit 6 is configured to be connected to the power grid via the first output node $6_{OUT1}$ and the second output node $6_{OUT2}$.

A control circuit 63 drives the switches $61_1$, $61_2$, $62_1$, $62_2$ of the two half bridges based on a grid voltage signal $S_{VAC}$. This grid voltage signal $S_{VAC}$ indicates if the grid voltage $V_{AC}$ is positive or negative, that is, the grid voltage signal $S_{VAC}$ indicates the positive halfwave and the negative halfwave of the grid voltage $V_{AC}$. When the grid voltage signal $S_{VAC}$ indicates the positive halfwave of the grid voltage $V_{AC}$ it switches on the high side switch $61_1$ of the first half bridge and the low side switch $62_2$ of the second half bridge and switches off the high side switch $62_1$ of the second half bridge and the low side switch $61_2$ of the first half bridge. During the negative halfwave of the grid voltage $V_{AC}$, the control circuit 63 switches on the high side switch $62_1$ of the second half bridge and the low side switch $61_2$ of the first half bridge and switches off the high side switch $61_1$ of the first half bridge and the low side switch $61_2$ of the second half bridge. The control circuit 63 drives the individual high side and low side switches by generating drive signals $S61_1$, $S61_2$, $S62_1$, $S62_2$ received by these switches.

Figure 19:
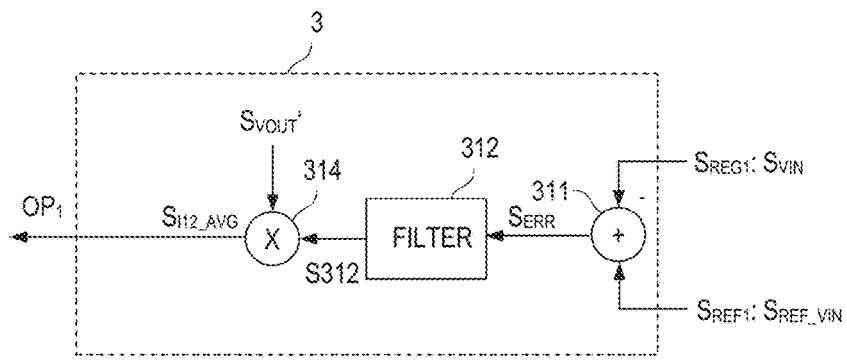
FIG. 19 shows one example of an operating parameter controller that may be implemented in the control circuit shown in FIG. 16.

Referring to the above, in the power converter circuit shown in FIG. 16, the converter stage 1 may be implemented with a buck topology as shown in FIG. 9. In the buck converter topology shown in FIG. 9, the output current $I_{OUT}$ equals the average inductor current $I12_{AVG}$. In the power converter circuit shown in FIG. 16, it is desired that the signal waveform of the output current $I_{OUT}$ follows the waveform of the output voltage $V_{OUT}$. That is, it is desired to generate the output current $I_{OUT}$ and, therefore, the average inductor current $I12_{AVG}$ with a rectified sinusoidal waveform. One example of an operating parameter controller that may be implemented in the control circuit 2 shown in FIG. 16 is illustrated in FIG. 19. This operating parameter controller 3 is configured to generate the first operating point signal $OP_1$ that represents the average inductor current such that the input voltage $V_{IN}$ is regulated and the average inductor $I12_{AVG}$ current has the waveform of a rectified sinusoidal signal. The first parameter signal $S_{REG1}$ is a signal $S_{VIN}$ that represents the input voltage $V_{IN}$. The setpoint signal $S_{SET1}$ is a signal $S_{SET\_VIN}$ that represents a desired voltage level of the input voltage $V_{IN}$. The operating parameter controller 3 shown in FIG. 19 is based on the operating parameter controller shown in FIG. 15 and includes the calculator 311 that calculates the difference between the setpoint signal $S_{SET1}$ and the operating parameter signal $S_{REG1}$ in order to generate the error signal $S_{ERR}$. A filter 312 filters the error signal $S_{ERR}$. Like in the example shown in FIG. 15, the filter 312 may have one of a proportional (P) characteristic, a proportional-integrative (PI) characteristic, a proportional-integrative, derivative (PID) characteristic, or the like. A multiplier 314 multiplies a filter output signal S312 with a signal $S_{VOUT}'$ that represents a signal waveform of the output voltage $V_{OUT}$ in order to generate the first operating point signal $OP_1$, which represents the desired average current level of the inductor current $I12$. This operating point signal $OP_1$ varies as the output voltage $V_{OUT}$ (which is defined by the grid voltage $V_{AC}$) varies. That is, in this example, the operating point signal $OP_1$ has the waveform of a rectified sinusoidal signal, wherein an amplitude is defined by the filter output signal S312 in order to regulate the input voltage $V_{IN}$. According to one example, the signal $S_{VOUT}'$ is proportional to the output voltage $V_{OUT}$. According to another example, the signal $S_{VOUT}'$ is a normalized signal that represents the waveform of the output voltage $V_{OUT}$, but has a predefined amplitude. According to one example, the signal $S_{VOUT}'$ is obtained by measuring the output voltage VOUT and by dividing the obtained signal by the voltage level of the input voltage $V_{IN}$.

Referring to the explanation of FIG. 9, in a buck converter, which may be used in the converter stage shown in FIG. 16, the operating point is defined by the average inductor current $I12_{AVG}$, the input voltage VIN, and the output voltage $V_{OUT}$. Thus, in the power converter circuit shown in FIG. 16, the control circuit, additionally to the current measurement circuit $S_{I12}$ and the input voltage signals $S_{VIN}$, may receive an output voltage signal $S_{VOUT}$ representing the output voltage $V_{OUT}$ in order to detect the operating point.

Figure 20:
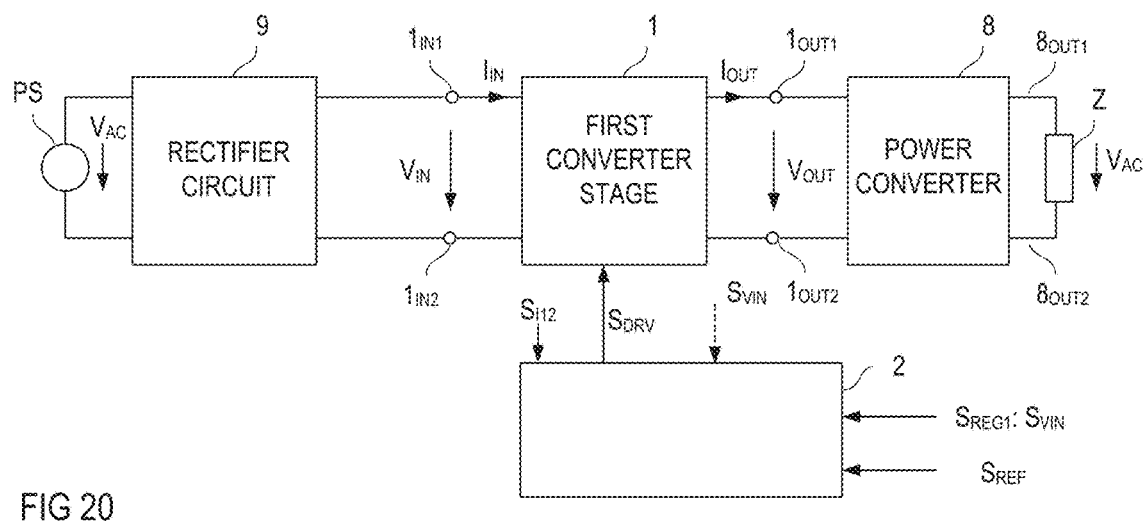
FIG. 20 shows an example of a power converter circuit that includes a rectifier circuit connected upstream the converter stage and a second converter stage connected downstream the converter stage.
Figure 21A:
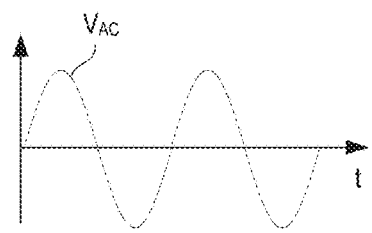
FIGS. 21A to 21C show timing diagrams that illustrate signal waveforms of signals occurring in the power converter circuit shown in FIG. 20.
Figure 21B:
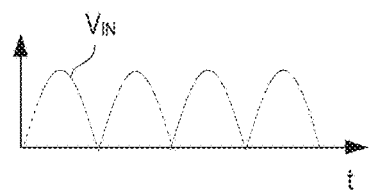
Figure 21C:
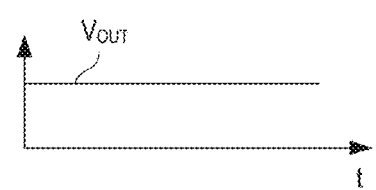

FIG. 20 shows a power converter circuit with a converter stage 1 and a control circuit 2 controlling operation of the converter stage 1 according to another example. In this example, the power converter circuit further includes a rectifier circuit 9 connected between a power source and the input $1_{IN1}$, $1_{IN2}$ of the converter stage 1 and the further power converter 8 connected between the output $1_{OUT1}$, $1_{OUT2}$ of the converter stage 1 and a load Z. According to one example, the power source PS provides an alternating voltage $V_{AC}$ with a sinusoidal waveform. The rectifier circuit 9 is configured to rectify the received alternating voltage $V_{AC}$ such that the input voltage $V_{IN}$ received by the converter stage 1 has the waveform of a rectified sinusoidal signal. Further, the control circuit 2 is configured to control operation of the converter stage 1 such that the output voltage $V_{OUT}$ is a regulated DC voltage. Examples of signal waveforms of the alternating voltage $V_{AC}$ received by the rectifier circuit 9, the input voltage $V_{IN}$ received by the converter stage 1 and the output voltage $V_{OUT}$ provided by the converter stage 1 are shown in FIGS. 21A, 21B and 21C, respectively. According to one example, the converter stage 1 has a boost converter topology as shown in FIG. 10 and the control circuit 2 is configured to control operation of the converter stage 1 such that a signal waveform of the input current IN of the converter stage 1 is in phase with the input voltage $V_{IN}$. This is equivalent to controlling operation of the converter stage 1 such that the average inductor current I12$_{AVG}$ is in phase with the input voltage V$_{IN}$.

Figure 22:
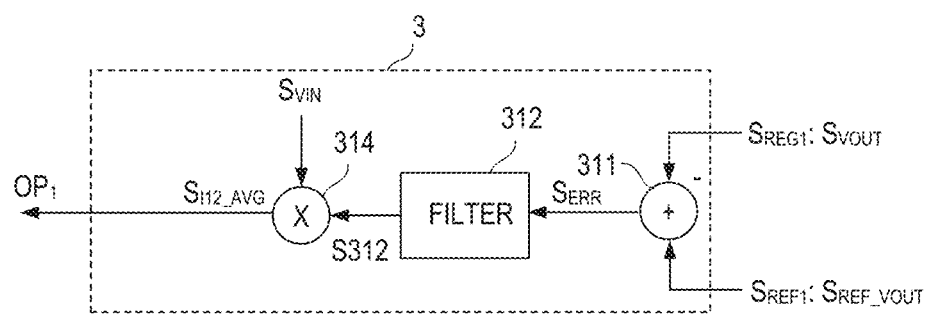
FIG. 22 shows one example of an operating parameter controller that may be implemented in the control circuit shown in FIG. 14.

An operating parameter controller that is configured to suitably generate the first operating point signal OP$_1$ such that the average inductor current I12$_{AVG}$ is in phase with the input voltage V$_{IN}$ as shown in FIG. 22. This operating parameter controller 3 is based on the operating parameter controller shown in FIG. 19 and is different from this operating parameter controller in that the regulated operating parameter is the output voltage V$_{OUT}$ so that the operating parameter signal S$_{REG1}$ is a signal S$_{VOUT}$ that represents the output voltage V$_{OUT}$ r. Consequently, the setpoint signal S$_{SET1}$ is a signal S$_{SET\_VOUT}$ that represents the desired voltage level of the output voltage V$_{OUT}$. Further, the multiplier 314 receives a signal S$_{VIN}$ representing the input voltage V$_{IN}$ besides the filter output signal S312 in order to generate the first operating point signal OP$_1$.

Referring to the explanation provided in connection with FIG. 10, in a boost converter, which may be used in the converter stage shown in FIG. 20, the operating point is defined by the average inductor current I12$_{AVG}$, the input voltage V$_{IN}$, and the output voltage V$_{OUT}$. Thus, in the power converter circuit shown in FIG. 20, the control circuit, additionally to the current measurement circuit S$_{I12}$ and the output voltage signals S$_{VOUT}$, may receive an input voltage signal S$_{VIN}$ representing the input voltage V$_{IN}$ in order to detect the operating point.

In the power converter circuit shown in FIG. 16 the output voltage V$_{OUT}$ has the waveform of a rectified sinusoidal signal, and in the power converter circuit shown in FIG. 20 the input voltage V$_{IN}$ has the waveform of a rectified sinusoidal signal. In both power converter circuits, the average inductor current I12$_{AVG}$ is regulated such that it has the waveform of a rectified sinusoidal signal that is essentially in phase with the input voltage V$_{IN}$ or the output voltage V$_{OUT}$. In these power converter circuits, the operating point periodically varies due to the varying input voltage V$_{IN}$ or output voltage V$_{OUT}$. The instantaneous input power and output power varies in accordance with a sine square signal in these power converter circuits.

Figure 23A:
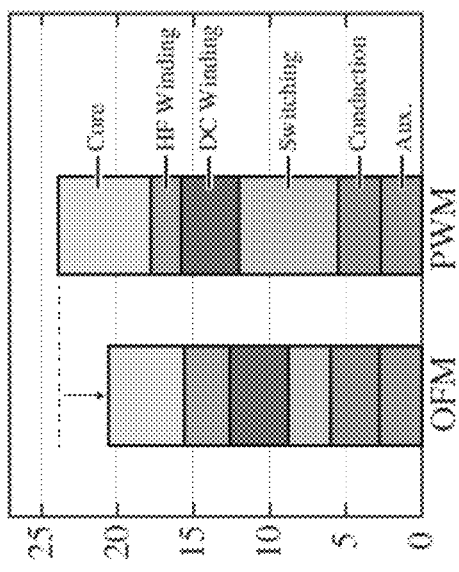
FIGS. 23A to 23F illustrate optimum switching frequencies, first and second current thresholds and power losses in a power converter circuit operated at an optimum switching frequency as compared to a power converter operated at fixed switching frequency.

FIG. 23A illustrates the optimum switching frequency f$_{S,opt}$ obtained by testing a power converter circuit of the type shown in FIG. 16 over one period of the rectified sinusoidal output voltage V$_{OUT}$. FIG. 23A shows the optimum switching frequencies f$_{S,opt}$ that were obtained by testing the power converter circuit at three different average output powers P1, P2, and P3. The "average output power" is the output power averaged over one period of the output voltage V$_{OUT}$. In the examples shown in FIG. 23A, a first output power P1 is greater than a second output power P2, and the second output power P2 is greater than a third output power P3, that is, P1>P2>P3. In FIG. 23A, a curve labeled with OFM@P1 denotes the optimum switching frequency at the first output power P1, the curve labeled with OFM@P2 shows the optimum switching frequency at the second output power P2, and the curve labeled with OFM@P3 denotes the optimum switching frequency at the third output power P3. As can be seen from FIG. 23A, in each case, the switching frequency varies over one period of the output voltage, wherein a maximum switching frequency increases as the output power decreases. That is, the maximum switching frequency at the third output power P3 is higher than a maximum switching frequency at the second output power P2, and the maximum switching frequency at the second output power P2 is greater than the maximum switching frequency at the first output power P1.

Figure 23E:
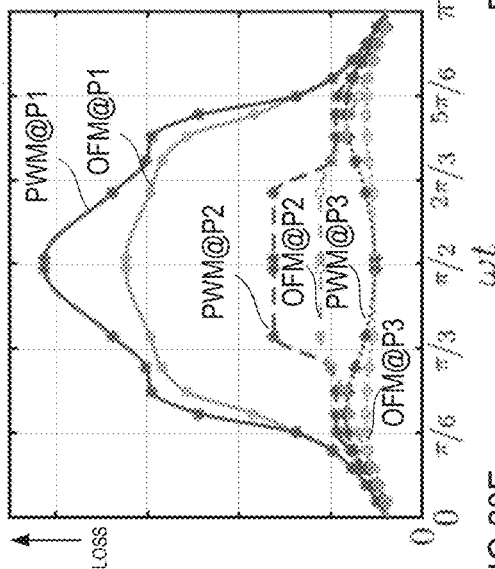
Figure 23B:
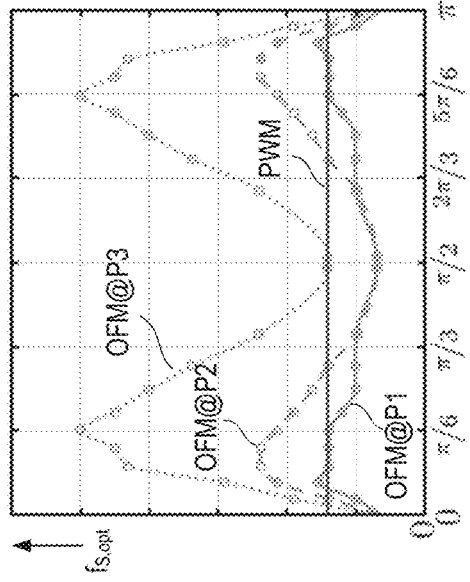

Referring to the above, each optimum switching frequency obtained at one operating point is associated with a first threshold S$_H$ and a second threshold S$_L$. The first and second thresholds associated with the curves of the optimum switching frequencies shown in FIG. 23A are illustrated in FIGS. 23B, 23C and 23D. FIG. 23B shows the first threshold and the second threshold obtained by testing the power converter circuit at the first output power P1, FIG. 23C shows the first threshold and the second threshold obtained by testing the power converter circuit at the second power P2, and FIG. 23D shows the first threshold and the second threshold obtained by testing the power converter circuit at the third power P3. In each of FIGS. 23B, 23C and 23D, the curve labeled with S$_H$, OFM illustrates the first threshold over one period of the output voltage, and the curve labeled with S$_L$, OFM illustrates the second threshold over one period of the output voltage. Referring to FIGS. 23B, 23C and 23D, dependent on the instantaneous output power of the power converter circuit, the second threshold S$_L$ can be negative. A negative second threshold S$_L$ and an associated positive first threshold S$_H$ is equivalent to that the inductor current I12 reverses its direction during one switching period. This may be associated with a zero voltage switching (ZVS). That is, towards the end of the switching period, the inductor current may discharge the parasitic capacitance (see FIG. 1) of the electronic switch 11 so that a voltage across the electronic switch 11 is essentially zero when the electronic switch 11 switches on at the beginning of the next switching period (drive period).

For comparison reasons, the power converter circuit underlying the curves shown in FIGS. 23A to 23D was also operated at a fixed switching frequency, so that only the duty cycle was varied. The curve that illustrates the switching frequency used in this scenario is labeled with PWM in FIG. 23A. When operating the power converter circuit at the fixed switching frequency the maximum inductor current and the minimum inductor current in each drive circle was detected. These maximum and minimum current correspond to the first and second threshold in a power converter circuit operated at the optimum switching frequency. These maximum and minimum inductor currents at the different operating points of the power converter circuit are also illustrated in FIGS. 23B, 23C and 23D. In each of these Figures, curves labeled with S$_H$, PWM illustrate the maximum inductor currents, and curves labeled with S$_L$, PWM illustrate the minimum inductor currents. As can be seen from FIGS. 23B, 23C and 23D, this maximum and minimum inductor currents observed at the fixed switching frequency deviate from the maximum and minimum inductor currents (which are given by the first and second thresholds S$_H$, S$_L$) in a power converter circuit operated at the optimum switching frequency.

It can be shown that operating the power converter circuit at the optimum switching frequency results in lower power losses. This is illustrated in FIG. 23E. FIG. 23E illustrates the power losses that were measured over one period of the output voltage at the three different output powers P1, P2, and P3. In FIG. 23E, a curve labeled with OFM@P1 illustrates the power losses measured when operating the power converter circuit at the first output power P1 and when operating the power converter circuit at the optimum switching frequency. A curve labeled with PWM@P1 illustrates the power losses that were measured when operating the power converter circuit at the fixed switching frequency. As can be seen from FIG. 23E, operating the power converter circuit at the optimum switching frequency results in lower power losses. The same applies when operating the power converter circuit at the second output power P2 and the third output power P3.

Figure 23F:
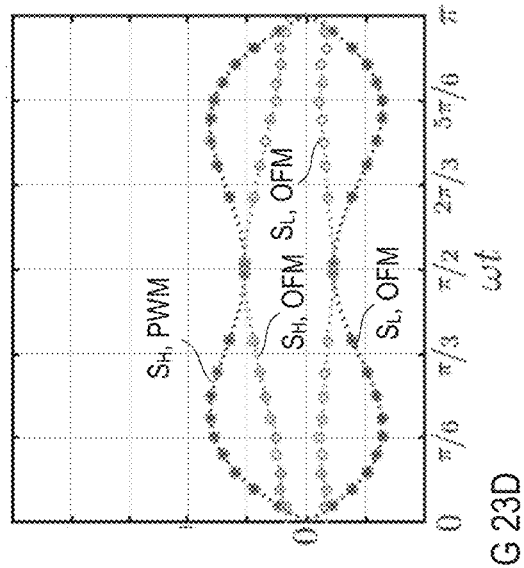
Figure 23C:
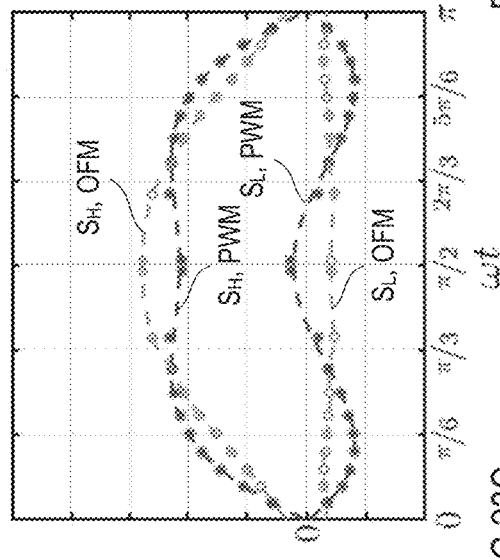
Figure 23D:
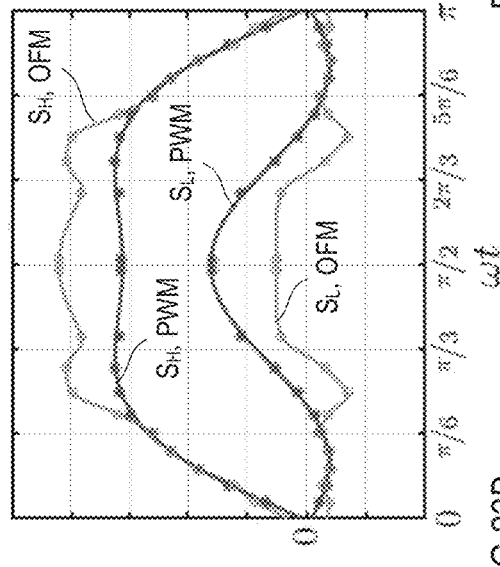

FIG. 23F illustrates different types of losses that may occur in operation of the power converter circuit. These losses include conductional losses, switching losses, losses in a core of the inductor, DC current losses in the inductor and high frequency (HF) current losses in the inductor, and other types of losses that are summarized by auxiliary losses in FIG. 23F. FIG. 23F compares the losses occurring in a power converter circuit operated at a fixed switching frequency (the diagram labeled with PWM in FIG. 23F) and losses occurring in the power converter circuit when operated at the optimum switching frequency (the diagram labeled with OFM in FIG. 23F). The diagrams shown in FIG. 23F show the power losses that were observed in the two different operation scenarios (fixed frequency and optimum frequency) at the same output power. As can be seen from FIG. 23F particularly the switching losses decrease when operating the power converter circuit at the optimum switching frequency instead of the fixed switching frequency.

Figure 24:
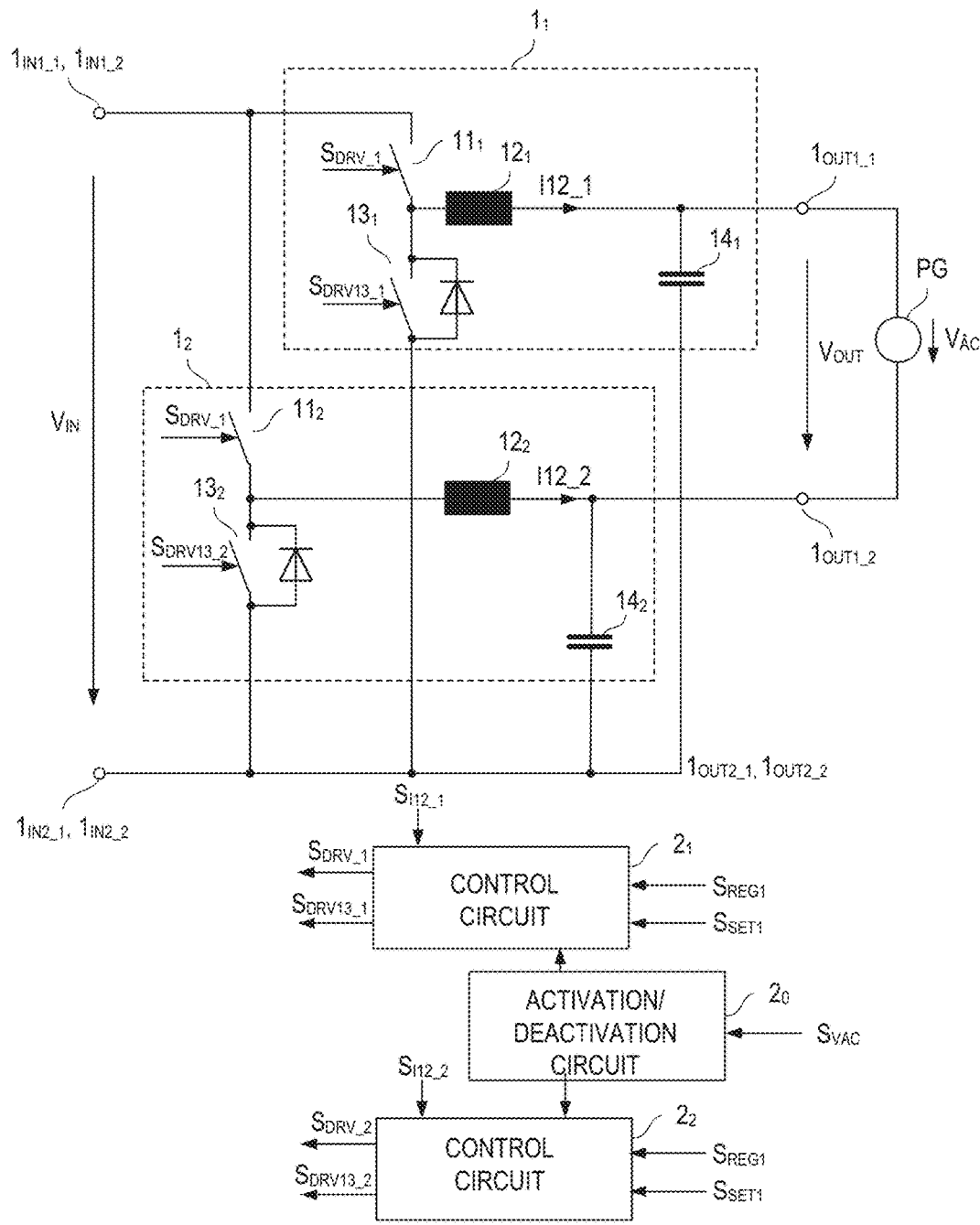
FIG. 24 shows one example of a power converter circuit with two converter stages and associated control circuits.

FIG. 24 shows one example of a first power converter that includes two converter stages $1_1$, $1_2$ each having a buck topology. These two converter stages $1_1$, $1_2$ may be used in a power converter circuit of the type shown in FIG. 16 instead of one converter stage 1 and the unfolding circuit 6. Each of these converter stages $1_1$, $1_2$ includes an electronic switch $11_1$, $11_2$, an active rectifier element $13_1$, $13_2$ and an inductor $12_1$, $12_2$. Inputs $1_{IN1\_1}$, $1_{IN2\_1}$, $1_{IN1\_2}$, $1_{IN2\_2}$ of these converter stages are connected in parallel so that each converter stage receives the input voltage $V_{IN}$. Further, second output nodes $1_{OUT2\_1}$, $1_{OUT2\_2}$ of the two converter stages $1i$, 12 are connected with each other and connected to the second input nodes $1_{IN2\_1}$, $1_{IN2\_2}$. An output of the arrangement with the two converter stages $1_1$, $1_2$ is formed by the first output node $1_{OUT1\_1}$ of the first converter stage $1_1$ and the first output node $1_{OUT1\_2}$ of the second converter stage $1_2$, wherein the power grid PG may be connected to this output.

Each of the two converter stages $1_1$, $1_2$ is controlled by a respective control circuit $2_1$, $2_2$. The power converter further includes an activation/deactivation circuit $2_0$ configured to activate and deactivate the control circuits $2_1$, $2_2$ dependent on an output voltage signal $S_{VOUT}$ that indicates if the output voltage $V_{OUT}$, which essentially equals the grid voltage $V_{AC}$, has a positive halfwave or a negative halfwave. During the positive halfwave, the activation/deactivation circuit $2_0$ activates the control circuit $2_1$ of the first converter stage $1_1$ and deactivates the control circuit $2_2$ of the second converter stage $1_2$. During the negative halfwave, the activation/deactivation circuit $2_0$ activates the control circuit $2_2$ of the second converter stage $1_2$ and deactivates the control circuit $2_1$ of the first converter stage $1_1$. The control circuit that is activated operates the corresponding converter stage as explained before. The control circuit that is deactivated permanently switches on the rectifier element $13_1$, $13_2$ of the corresponding converter stage.

Figure 25:
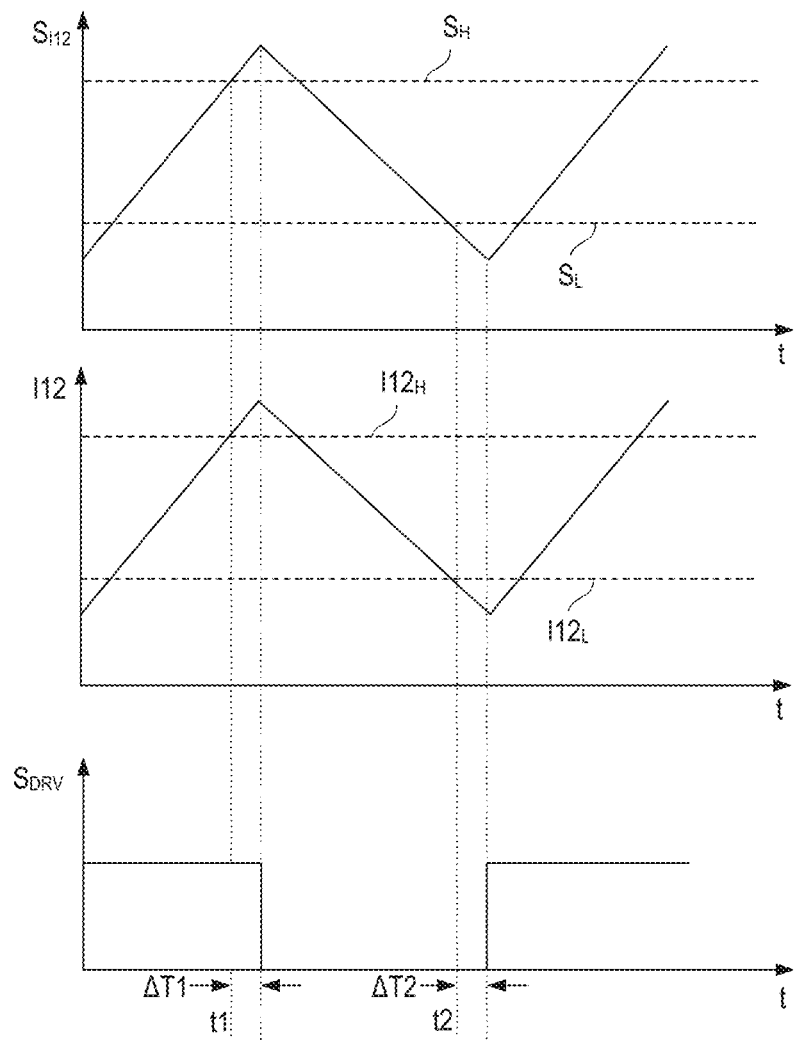
FIG. 25 shows signal waveforms that illustrate operation of the hysteresis controller in consideration of delays that may occur in the hysteresis controller.

In the hysteresis controller 3, which controls operation of the electronic switch 11 based on the first and second threshold $S_H$, $S_L$ received from the operating point controller 4 and the current measurement signal $S_{I12}$, there may be delays between time instances when the current measurement signal $S_{I12}$ reaches one of the first and second thresholds and time instances when the drive signal $S_{DRV}$ changes its signal level to switch on or off the electronic switch 11. This is illustrated in FIG. 25 that shows signal waveforms of the current measurement signal $S_{I12}$, the corresponding inductor current I12, and the drive signal $S_{DRV}$. In FIG. 25, $\Delta T1$ denotes a first delay time between a time instance t1 when the current measurement signal $S_{I12}$ reaches the first threshold $S_H$ and a time instance when a signal level of the drive signal $S_{DRV}$ changes from the on-level to the off-level, and $\Delta T2$ denotes a second delay time between a time instance t2 when the current measurement signal $S_{I12}$ reaches the second threshold $S_L$ and a time instance when a signal level of the drive signal $S_{DRV}$ changes from the off-level to the on-level. The second delay time $\Delta T2$ may include a delay time resulting from the first delay element $55_1$ shown in FIG. 14, if there is such delay element, and further includes propagation delays. During these delay times $\Delta T1$, $\Delta T2$ the inductor current increases above the maximum current level $I12_H$ associated with the first threshold $S_H$ and falls below the minimum current level $I12_L$ associated with the second threshold $S_L$. This may result in an average inductor current $I12_{AVG}$ that deviates from the desired average inductor current.

According to one example, the operating point controller 4 is configured to compensate for these delay times such that the first threshold $S_H$ is associated with a current level that is lower than the current level at which it is desired to switch off the electronic switch 11 and such that the second threshold $S_L$ is associated with a current level that is higher than the current level at which it is desired to switch on the electronic switch 11.

Referring to FIG. 14, the hysteresis controller may include a first delay element $55_1$ that delays switching on the first electronic switch 11 by the drive signal $S_{DRV}$ after switching off the second switching element 131 in the rectifier element by the drive signal $S_{DRV13}$, and a second delay element $55_2$ that delays switching on the second electronic switch 131 after switching off the first electronic switch 11. According to one example, at least one of these delay elements $55_1$, $55_2$ receives a respective delay adjustment signal $S_{DEL1}$, $S_{DEL2}$ that adjusts the delay time. According to one example (shown in dashed lines in Figure) the least one of these delay adjustment signals $S_{DEL1}$, $S_{DEL2}$ is provided by the operating point controller 4 dependent on the operating point. In this example, testing or simulating the power converter circuit does not only include varying the switching frequency $f_S$ at one operating point, but also includes varying the at least one delay times. During those delay times, a voltage across the electronic switch that is to be switched on next may decrease to zero, so that the delay time may help to switch on the electronic switch under ZVS (zero voltage switching) conditions. According to one example, the at least one delay element that has its delay time adjusted by the operating point controller 4 is the second delay element $55_2$, which delays switching on the second electronic switch after switching off the first electronic switch.

Referring to the above, the first and second threshold associated with each operating point may be chosen such that power losses are minimized. This may include testing or simulating the power converter circuit at the different operating points and finding the first threshold and the second threshold (by varying the switching frequency) at which the lowest power losses occur. According to one example, one or more additional constraints may be taken into account in testing or simulating the power converter circuit. According to one example, an additional constraint is that the switching frequency does not exceed a predefined frequency threshold. In this example, during test or simulation the switching frequency is restricted to a certain frequency range, that is, the switching frequency is only varied within the predefined frequency range. In this case, first and second thresholds associated with one operating point may represent a local minimum of the power losses, but not an absolute minimum of the power losses at the respective operating point. Referring to the above, implementing the converter stage 1 with a buck topology as shown in FIG. 9 or a boost topology as shown in FIG. 10 are only examples. Further examples are explained with reference to FIGS. 26 to 28 below.

Figure 26:
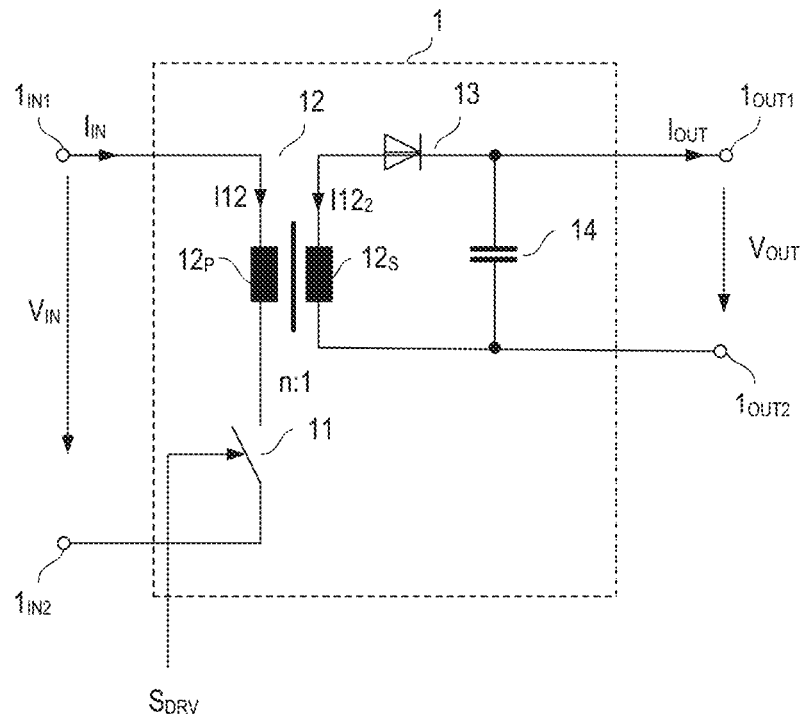
FIG. 26 shows one example of a converter stage with a flyback (converter) topology.

FIG. 26 shows one example of a converter stage 1 with a flyback converter topology (flyback topology). In this topology, the inductor 12 is a transformer with a primary winding $12_P$ and a secondary winding $12_S$ that are inductively coupled. The primary winding $12_P$ is connected in series with the electronic switch 11, wherein this series circuit is connected between the first input node $1_{IN1}$ and the second input node $1_{IN2}$ of the converter stage. A series circuit with the secondary winding $12_S$ and the rectifier element 13 is connected in parallel with the capacitor 14 wherein the capacitor 14 is connected between the first output node $1_{OUT1}$ and the second output node $1_{OUT2}$. The output voltage $V_{OUT}$ is available across the capacitor 14. The rectifier element 13 is drawn as a passive rectifier element but may be implemented as an active rectifier element as well. The primary winding $12_P$ and the secondary winding $12_S$ have opposite winding senses. A winding ratio between the number of turns of the primary winding $12_P$ and the number of turns of the secondary winding $12_S$ is given by n:1, that is, the number of turns of the primary winding $12_P$ is n times the number of turns of the secondary winding $12_S$.

Figure 27:
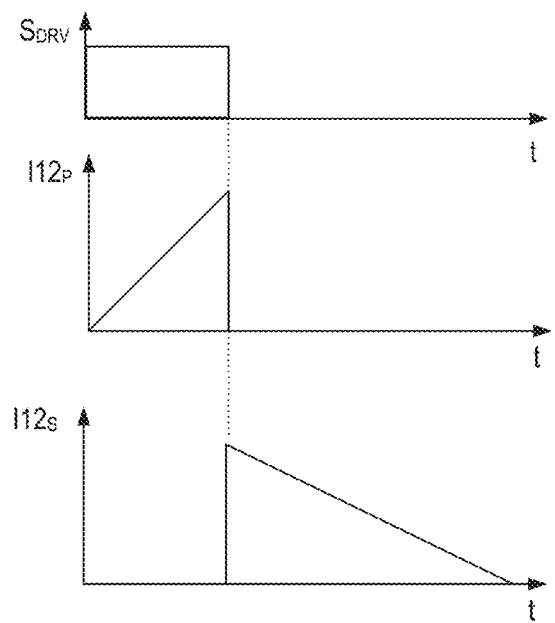
FIG. 27 shows timing diagrams of signals occurring in the flyback converter shown in FIG. 26.

In the flyback converter topology, during the on-period, a current $I12_P$ flows through the primary winding $12_P$ while the current through the secondary winding $12_S$ is zero. During the off-time, the current through the primary winding $12_P$ is zero and a current flows through the secondary winding $12_S$. This is illustrated in FIG. 27 that shows signal waveforms of the primary current $I12_P$ and the secondary current $I12_S$ during one drive cycle. The current $I12_P$ through the primary winding $12_P$ increases during the on-time, and the current through the secondary winding $12_S$ decreases during the off-time. A slope of the current $I12_P$ through the primary winding $12_P$ during the on-period is given by the input voltage $V_{IN}$ divided by the inductance L of the primary winding $12_P$. During the off-period, a slope of the current $I12_S$ through the secondary winding $12_S$ is given by $n \cdot V_{OUT}/L$, where n defines the winding ratio.

When the converter stage 1 includes a flyback converter as shown in FIG. 26, the current measurement signal $S_{I12}$ received by the hysteresis controller 3 (not shown in FIG. 26) includes two sub-signals, a first sub-signal that represents the current $I12_P$ through the primary winding $12_P$ and a second sub-signal that represents the current through the secondary winding $12_S$. The hysteresis controller 3 (not shown in FIG. 26) compares the first sub-signal with the first threshold $S_H$ and switches the electronic switch 11 off when the first sub-signal reaches the first threshold $S_H$ and compares the second sub-signal with the second threshold $S_L$ and switches the electronic switch 11 on when the second sub-signal reaches the second threshold $S_L$.

Figure 28:
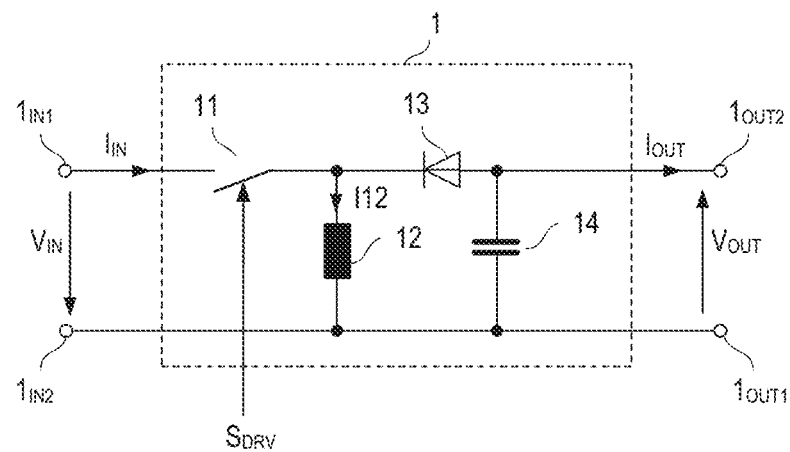
FIG. 28 shows one example of a converter stage with an inverting buck-boost topology.

FIG. 28 shows one example of a converter stage with an inverting buck-boost topology. In this topology, a series circuit with the electronic switch 11 and the inductor 12 is connected between the input nodes $1_{IN1}$, $1_{IN2}$, and a series circuit with the rectifier element 13 and the capacitor 14 is connected in parallel with the inductor 12, wherein a polarity of the rectifier element is changed as compared to the buck topology, for example.

Figure 29:
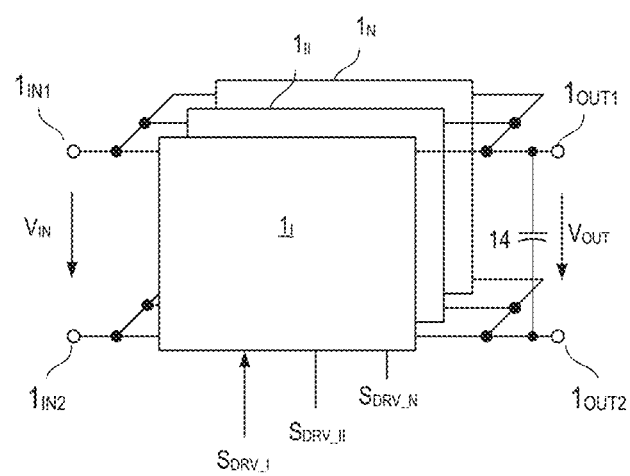
FIG. 29 shows one example of a power converter circuit with several converter stages connected in parallel.

The power converter circuit shown in FIG. 1 includes one converter stage 1. This, however, is only an example. According to another example, which is schematically illustrated in FIG. 29, the power converter circuit includes several converter stages $1_I$, $1_{II}$, $1_N$ connected in parallel. "Connected in parallel" means that these converter stages have a common input $1_{IN1}$, $1_{IN2}$ and receive the same input voltage VI and have a common output $1_{OUT1}$, $1_{OUT2}$ where they are connected to a common capacitor 14. Each of these converter stages $1_I$, $1_{II}$, $1_N$ may be implemented in accordance with one of the topologies explained herein before. Each of these converter stages $1_I$, $1_{II}$, $1_N$ receives a respective drive signal $S_{DRV\_I}$, $S_{DRV\_II}$, $S_{DRV\_N}$. According to one example, the drive signals $S_{DRV\_I}$, $S_{DRV\_II}$, $S_{DRV\_N}$ are identical so that one control circuit may be used to generate these drive signals $S_{DRV\_I}$, $S_{DRV\_II}$, $S_{DRV\_N}$. According to another example, the drive signals $S_{DRV\_I}$, $S_{DRV\_II}$, $S_{DRV\_N}$ have the same duty cycle but there is a time shift between the individual drive signals $S_{DRV\_I}$, $S_{DRV\_II}$, $S_{DRV\_N}$ in order to operate the individual converter stages $1_I$, $1_{II}$, $1_N$ in an interleaved fashion. In case, one drive signal is generated by one control circuit and the drive signals $S_{DRV\_I}$, $S_{DRV\_II}$, $S_{DRV\_N}$ are generated based on the one drive signal by phase shift operations, wherein one of the converter stages $1_I$, $1_{II}$, $1_N$ may receive the one drive signal.

What is claimed is:
1. A power converter circuit, comprising:
at least one converter stage comprising an input configured to receive an input power, an output configured to supply an output power, a first electronic switch, and a first inductor coupled to the first electronic switch; and
a control circuit comprising:
a hysteresis controller configured to drive the first electronic switch based on a current measurement signal representing a current through the inductor, a first threshold signal, and a second threshold signal;
an operating point controller comprising a look-up table, and configured to detect an operating point of the at least one converter stage and to generate the first threshold signal and the second threshold signal based on the detected operating point and the look-up table; and
an operating parameter controller configured to receive at least a first operating parameter signal representing a first operating parameter of the at least one converter stage and a first setpoint signal associated with the first operating parameter, and to generate a first operating point signal based on the first operating parameter signal and the first setpoint signal,
wherein the operating point controller is configured to detect the operating point based on the first operating parameter signal,
wherein the first operating parameter is an output voltage of the at least one converter stage,
wherein the first operating parameter signal represents a signal level of the output voltage,
wherein the first setpoint signal represents a desired signal level of the output voltage,
wherein the control circuit is configured to regulate the output voltage by regulating the input power of the at least one converter stage.
2. The power converter circuit of claim 1, wherein the operating point controller is configured to detect the operating point based on at least one further operating parameter signal.

3. The power converter circuit of claim 2, wherein the at least one further operating parameter signal represents an input voltage of the at least one converter stage.

4. The power converter circuit of claim 1, wherein the at least one converter stage has a topology selected from the group consisting of:
a buck topology;
a boost topology;
a flyback topology; and
an inverting buck-boost topology.

5. The power converter circuit of claim 1, further comprising:
a power converter having an output coupled to the input of the at least one converter stage.

6. The power converter circuit of claim 1, further comprising:
a power converter having an input coupled to the output of the at least one converter stage.

7. The power converter circuit of claim 1, wherein the hysteresis controller is configured to switch off the first electronic switch when the current measurement signal reaches a first threshold represented by the first threshold signal, and switch on the first electronic switch when the current measurement signal reaches a second threshold represented by the second threshold signal.

8. The power converter circuit of claim 1, wherein the at least one converter stage comprises a second electronic switch, and wherein the hysteresis controller is configured to drive the second electronic switch based on the current measurement signal, the first threshold signal, and the second threshold signal.

9. The power converter circuit of claim 8, wherein driving the second electronic switch by the hysteresis controller comprises:
waiting a variable delay time between switching off the first electronic switch and switching on the second electronic switch,
wherein the variable delay time is dependent on a delay time adjustment signal, and
wherein the delay time adjustment signal is provided by the operating point controller dependent on the detected operating point.

10. The power converter circuit of claim 1, wherein the look-up table holds individual first and second threshold values associated with individual operating points, wherein the operating point detected by the operating point controller is between a first operating point and a second operating point for each of which the look-up table holds a respective pair of first and second threshold values, and wherein the operating point controller comprises a calculation unit configured to calculate the first threshold signal and the second threshold signal based on the first and second threshold values associated with the first and second operating points.

11. A method, comprising:
detecting an operating point of at least one converter stage based on a first operating parameter signal which represents a first operating parameter of the at least one converter stage, the at least one converter stage including a first electronic switch and an inductor coupled to the first electronic switch in a power converter circuit;
generating a first operating point signal based on the first operating parameter signal and a first setpoint signal associated with the first operating parameter, wherein the first operating parameter is an output voltage of the at least one converter stage, wherein the first operating parameter signal represents a signal level of the output voltage, wherein the first setpoint signal represents a desired signal level of the output voltage;
selecting a first threshold and a second threshold based on the detected operating point and a look-up table; and
regulating the output voltage by regulating an input power of the at least one converter stage, including driving the first electronic switch based on the first threshold and the second threshold and a current measurement signal representing a current through the inductor.

12. The method of claim 11, wherein driving the first electronic switch comprises:
switching off the first electronic switch when the current measurement signal reaches the first threshold; and
switching on the first electronic switch when the current measurement signal reaches the second threshold.

13. The method of claim 12, wherein driving the first electronic switch further comprises at least one of:
selecting at least one of a first delay time and a second delay time based on the detected operating point; and
waiting the first delay time between detecting that the current measurement signal reaches the first threshold and switching off the first electronic switch and/or waiting the second delay time between detecting that the current measurement signal reaches the second threshold and switching on the first electronic switch.

14. The method of claim 11, wherein the look-up table holds individual first and second threshold values associated with individual operating points, wherein the detected operating point is between a first operating point and a second operating point for each of which the look-up table holds a respective pair of first and second threshold values, and wherein selecting the first threshold and the second threshold based on the detected operating point and the look-up table comprises:
calculating the first threshold and the second threshold based on the first and second threshold values associated with the first and second operating points.

15. A method, comprising:
finding an optimum switching frequency of an electronic switch in a power converter stage of a power converter circuit at each of a plurality of different operating points;
sensing a current through an inductor connected in series with the electronic switch;
in each operating point, at the optimum switching frequency, detecting a maximum current through the inductor and a minimum current through the inductor, and storing the maximum current through the inductor and the minimum current through the inductor in a look-up table.

16. The method of claim 15, wherein finding the optimum switching frequency comprises finding the optimum switching frequency such that power losses at the optimum switching frequency have a minimum.

17. The method of claim 15, wherein finding the optimum switching frequency comprises varying the switching frequency in a predefined frequency range.

18. The method of claim 15, wherein finding the optimum switching frequency comprises testing and/or simulating the power converter circuit.

* * * * *